(12) United States Patent
Rui et al.

(10) Patent No.: US 8,656,270 B2
(45) Date of Patent: Feb. 18, 2014

(54) CHANGE-ORIENTED SPREADSHEET APPLICATION

(75) Inventors: SuYing Rui, Beijing (CN); FengLi Wang, Beijing (CN); Jin Yu, Beijing (CN); Li Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1317 days.

(21) Appl. No.: 11/839,709

(22) Filed: Aug. 16, 2007

(65) Prior Publication Data

US 2008/0046804 A1  Feb. 21, 2008

(30) Foreign Application Priority Data

Aug. 18, 2006 (CN) .......................... 2006 1 0115933

(51) Int. Cl.
*G06F 17/40* (2006.01)
*G06F 17/16* (2006.01)

(52) U.S. Cl.
USPC ........... 715/212; 715/214; 715/219; 715/229; 707/661; 707/723; 707/725

(58) Field of Classification Search
USPC .......... 715/212, 214, 219, 229; 707/661, 723, 707/725
See application file for complete search history.

(56) References Cited

U.S. PATENT DOCUMENTS

| 5,303,146 | A | 4/1994 | Ammirato et al. |
| 5,499,180 | A | 3/1996 | Ammirato et al. |
| 5,721,847 | A | 2/1998 | Johnson |
| 5,806,078 | A | 9/1998 | Hug et al. |
| 5,819,293 | A | 10/1998 | Comer et al. |
| 5,890,176 | A | 3/1999 | Kish et al. |
| 5,926,818 | A * | 7/1999 | Malloy ................................ 1/1 |
| 5,926,822 | A | 7/1999 | Garman |
| 6,240,427 | B1 * | 5/2001 | Szalwinski et al. ................... 1/1 |
| 6,438,565 | B1 | 8/2002 | Ammirato et al. |
| 6,490,600 | B1 * | 12/2002 | McGarry ...................... 715/201 |
| 6,920,608 | B1 | 7/2005 | Davis |

(Continued)

FOREIGN PATENT DOCUMENTS

| CN | 1904879 | 1/2007 |
| WO | WO/2005/081126 | 9/2005 |

OTHER PUBLICATIONS

OASIS, Open Document Format for Office Applications (OpenDocument) v1.0, OASIS Standard, May 1, 2005, OpenDocument-v1.0-os-sxw; Copyright OASIS Open 2002-2005.

*Primary Examiner* — Stephen Hong
*Assistant Examiner* — Wilson Tsui
(74) *Attorney, Agent, or Firm* — Fleit Gibbons Gutman Bongini & Bianco PL; Thomas Grzesik

(57) ABSTRACT

The invention discloses a data organization method for a change oriented spreadsheet application. In one embodiment, the valid updates to cells and the update times are stored with the cell positions as the primary index, and the valid updates to the same cell are arranged in the order of time. In another embodiment, the valid updates to cells are stored with the update time points of the valid updates of the cells as the primary index, and all the valid updates at the same valid update time point are arranged into an update table, the update table having the same cell structure as the spreadsheet file. In yet another embodiment, data structures organized in both manners are maintained at the same time.

20 Claims, 24 Drawing Sheets

(56) References Cited

U.S. PATENT DOCUMENTS

| | | | |
|---|---|---|---|
| 7,069,499 B1* | 6/2006 | McGarry | 715/203 |
| 7,734,661 B2* | 6/2010 | Jordan et al. | 707/803 |
| 2001/0001864 A1 | 5/2001 | Page et al. | |
| 2002/0010743 A1 | 1/2002 | Ryan et al. | |
| 2002/0042833 A1* | 4/2002 | Hendler et al. | 709/231 |
| 2002/0055953 A1* | 5/2002 | Tesch et al. | 707/504 |
| 2002/0116417 A1 | 8/2002 | Weinberg et al. | |
| 2002/0174141 A1 | 11/2002 | Chen | |
| 2002/0184260 A1* | 12/2002 | Martin et al. | 707/503 |
| 2003/0225660 A1 | 12/2003 | Noser et al. | |
| 2003/0226105 A1 | 12/2003 | Waldau | |
| 2004/0103365 A1 | 5/2004 | Cox | |
| 2004/0133568 A1 | 7/2004 | Witkowski et al. | |
| 2004/0205524 A1 | 10/2004 | Richter et al. | |
| 2004/0236950 A1 | 11/2004 | Carte | |
| 2005/0149482 A1 | 7/2005 | Dillon | |
| 2005/0223051 A1 | 10/2005 | Arakaki | |
| 2006/0010118 A1 | 1/2006 | Sattler et al. | |
| 2006/0010367 A1 | 1/2006 | Sattler et al. | |
| 2006/0036939 A1 | 2/2006 | Hobbs et al. | |
| 2006/0048044 A1 | 3/2006 | Genesereth et al. | |
| 2006/0053383 A1 | 3/2006 | Gauthier et al. | |
| 2006/0069696 A1 | 3/2006 | Becker et al. | |
| 2006/0129595 A1* | 6/2006 | Chen | 707/102 |
| 2006/0161576 A1 | 7/2006 | Barrs et al. | |
| 2007/0028159 A1 | 2/2007 | Ying et al. | |

* cited by examiner

CHANGE-ORIENTED SPREADSHEET APPLICATION

CROSS-REFERENCE TO RELATED APPLICATIONS

This application is based upon and claims priority from a prior Chinese Patent Application No. 200610115933.0, filed on Aug. 18, 2006 the entire disclosure of which is herein incorporated by reference in its entirety.

FIELD OF THE INVENTION

The present invention relates to a spreadsheet application, particularly, to a change oriented spreadsheet application, and more particularly, to methods and apparatuses for data organization, query, presentation, and data management for a change oriented spreadsheet application.

BACKGROUND OF THE INVENTION

At present, spreadsheet applications are widely used in many fields. A common application is for an enterprise to generate periodically financial reports, submitting spreadsheet reports with similar or same templates monthly, weekly, or even daily. An accountant also needs to establish salary reports based on the same template every month.

Especially for small or medium-sized enterprises, because of limitations in system resources, spreadsheet applications are commonly used in place of relational databases, which are more powerful but impose high requirements on system resources, to store and manage data. Relational databases, although more powerful, are more expensive, and have very high development and maintenance costs, therefore small and medium-sized enterprises would sometimes use spreadsheet software to store and maintain data. For example, in a warehouse management scenario, if a conventional spreadsheet application is used, the warehouse keeper needs to generate inventory tables periodically to be queried. This has at least two problems. First, the time granularity for query can be limited. The inventory information changes occurring between two time points designated for storing the information could not be queried. Second, the warehouse keeper often has to maintain multiple spreadsheet files to ensure that the inventory information in a past period could be queried. Not only warehouse keepers need to store data into spreadsheets periodically or non-periodically, but also researchers may need to generate the tables of each experiment. Accountants may also need to record the salaries of the employees periodically. Teachers may also need to store the students' scores after each exam, etc.

At present, if a user is to use a conventional spreadsheet application, a common approach is to generate a template, copy/paste areas/sheets in a spreadsheet file, etc. Then the user can submit conventional reports based on the template. Querying/aggregating these reports can be a difficult job because data of different periods are often stored separately, although they may relate to the same thing. Such queries may occur frequently.

In a conventional spreadsheet application, valid changes to data in the spreadsheet are often discarded, and only the current value of each item is recorded in the spreadsheet file. Thus, some useful operations may not be performed on the dataset conveniently.

There is a need for a change oriented spreadsheet application, wherein when a spreadsheet file is updated, not only the original content, but also the updated content and the time information related to the update are recorded in the same spreadsheet file, so that the user can obtain historical data using different query conditions, and view the historical data in various ways, such as in snapshots, charts, etc. Further, there is also a need for a data organization method for a change oriented spreadsheet application, which can guarantee valid updates insertion operations, as well as valid updates to query operations, as well as a need for query and presentation methods based on the data organization method. In addition, there is also a need for a data management method for a change oriented spreadsheet application that provides for archiving, restoring, deleting, and refining valid updates.

According what is needed is a method and system to overcome the problems encountered in the prior art.

SUMMARY OF THE INVENTION

What is presented is a spreadsheet application that provides a data organization method for a change oriented spreadsheet application for storing valid updates to cells of a change oriented spreadsheet file. The spreadsheet application is an enhancement to a conventional spreadsheet application and includes a "time" dimension such that, in the change oriented spreadsheet application, not only the original data of the cells but also the valid updates to the cells are recorded along with the time information related to the valid updates in the same spreadsheet file.

In one embodiment, the data organization method for the change oriented spreadsheet application stores the valid updates to cells and the update times with cell positions as the primary index for at least part of the cells in a spreadsheet, and all valid updates to the same cell are arranged in the order of time.

In another embodiment, the data organization method for the change oriented spreadsheet application stores the valid updates to cells with the update time points of the valid updates to the cells as the primary index for at least part of the cells in a spreadsheet, and organizes all valid updates at the same time point into an update table which has the same cell structure as the spreadsheet file.

In yet another embodiment, the data management method for the change oriented spreadsheet application stores the valid updates to cells and the update times in the spreadsheet file of the change oriented spreadsheet application for at least part of the cells in the spreadsheet; and maintains a first data structure and a second data structure on the valid updates. In the first data structure, the valid updates to cells and the update times are stored with the cell positions as the primary index, and all valid updates to the same cell are arranged in the order of time. In the second data structure, the valid updates to cells are stored with the update time points of the valid updates to the cells as the primary index, and all valid updates at the same update time point are arranged in an update table which has the same cell structure as the spreadsheet file.

In addition, the invention provides a data query method and a data presentation method for a spreadsheet file of the change oriented spreadsheet application based on the data organization method for the change oriented spreadsheet application in the above embodiments.

Moreover, the invention provides data management methods for the change oriented application, including a data archival method for the change oriented spreadsheet application, a data restoring method for the change oriented spreadsheet application, a data deletion method for the change oriented spreadsheet application, a data refinement method for the change oriented spreadsheet application, and a method for generating a refined report of a spreadsheet file of the change oriented spreadsheet application.

Further, the invention provides a data organization apparatus for the change oriented application corresponding to the data organization methods for the change oriented application in the three embodiment of the invention.

Furthermore, the invention provides a change oriented spreadsheet application system, comprising an input/output apparatus, a data organization apparatus, a data query apparatus, and a data presentation apparatus.

Preferably, the spreadsheet application system further comprises a data maintenance apparatus, comprising one or more of a data archival apparatus, a data restoring apparatus, a data deletion apparatus, and data refinement apparatus.

The invention will next be described in connection with certain illustrated embodiments. It should be understood that various changes and modifications can be made by those skilled in the relevant art without departing from the spirit or scope of the invention.

The foregoing and other features and advantages of the present invention will be apparent from the following more particular description of the preferred embodiments of the invention, as illustrated in the accompanying drawings.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DESCRIPTION OF THE PREFERRED EMBODIMENTS

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the following, the various aspects and preferred embodiments of the present invention will be described in detail with reference to the drawings.

Figure 1:
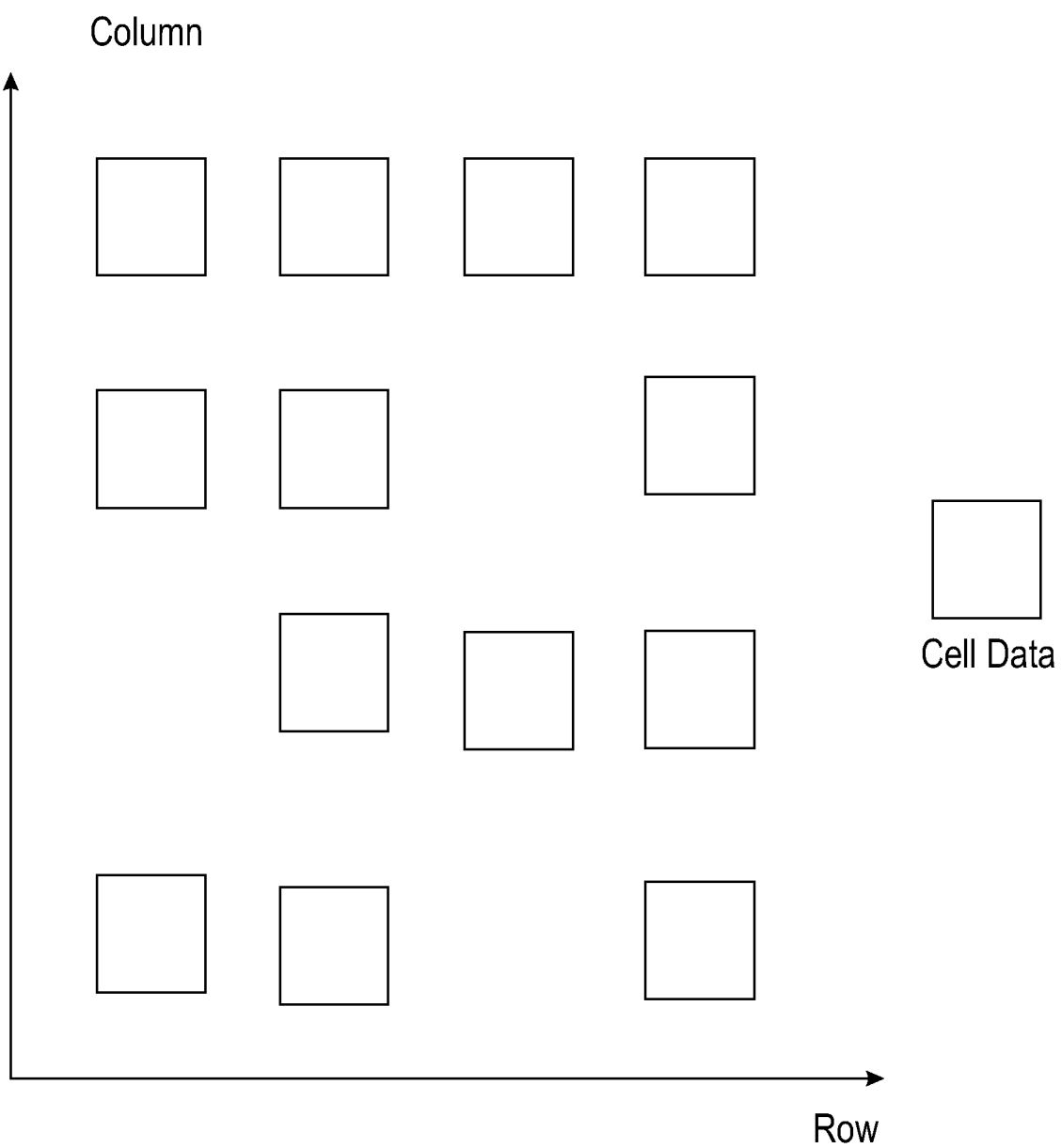
FIG. 1 is a schematic diagram illustrating the structure of a spreadsheet file content of a conventional spreadsheet application.

FIG. 1 shows an illustrative structure of the content of a spreadsheet file of a conventional spreadsheet application. As shown, in the spreadsheet file, cells are the basic units of the file content. A cell can be located by a row and a column. When the data in a cell is updated, the original content in the cell will be replaced by the new data.

The "change oriented spreadsheet application" of the present invention relates to a method for recording and organizing valid updates in a spreadsheet file together with the original data, and methods for data query, presentation and maintenance based on the data organization method. The spreadsheet file includes an implicit "time" dimension, which records the times when the original data and valid updates to cells occur, and extends the spreadsheet file and spreadsheet application into a time-related spreadsheet file and spreadsheet application. And this implicit dimension can be used as an index for obtaining a snapshot of the spreadsheet content, and used as an axis for generating charts from changes to the spreadsheet content.

In the present invention, a valid update is an update which has been confirmed by the user. Valid updates are only limited to the data originally inputted into the spreadsheet, excluding derived data, such as calculation results of charts, formulas, etc. The manner in which the user confirms an update operation can be the user's saving-to-disk operations or other operations, or can be performed periodically based on the user's settings. The time when a valid update occurs is related to the time when the valid update actually occurs or the time when the user confirms the update. Thus, the time granularity of valid updates can be arbitrary. In this application document, valid updates are sometimes broadly understood to include also the original data of cells.

On the other hand, in the present invention, the current value of a cell at a time point refers to the valid update to the cell occurring at this time point, and in case there is no valid update occurring to the cell at the time point, the valid change or original data occurring at the previous time point closest to this time point.

Figure 2:
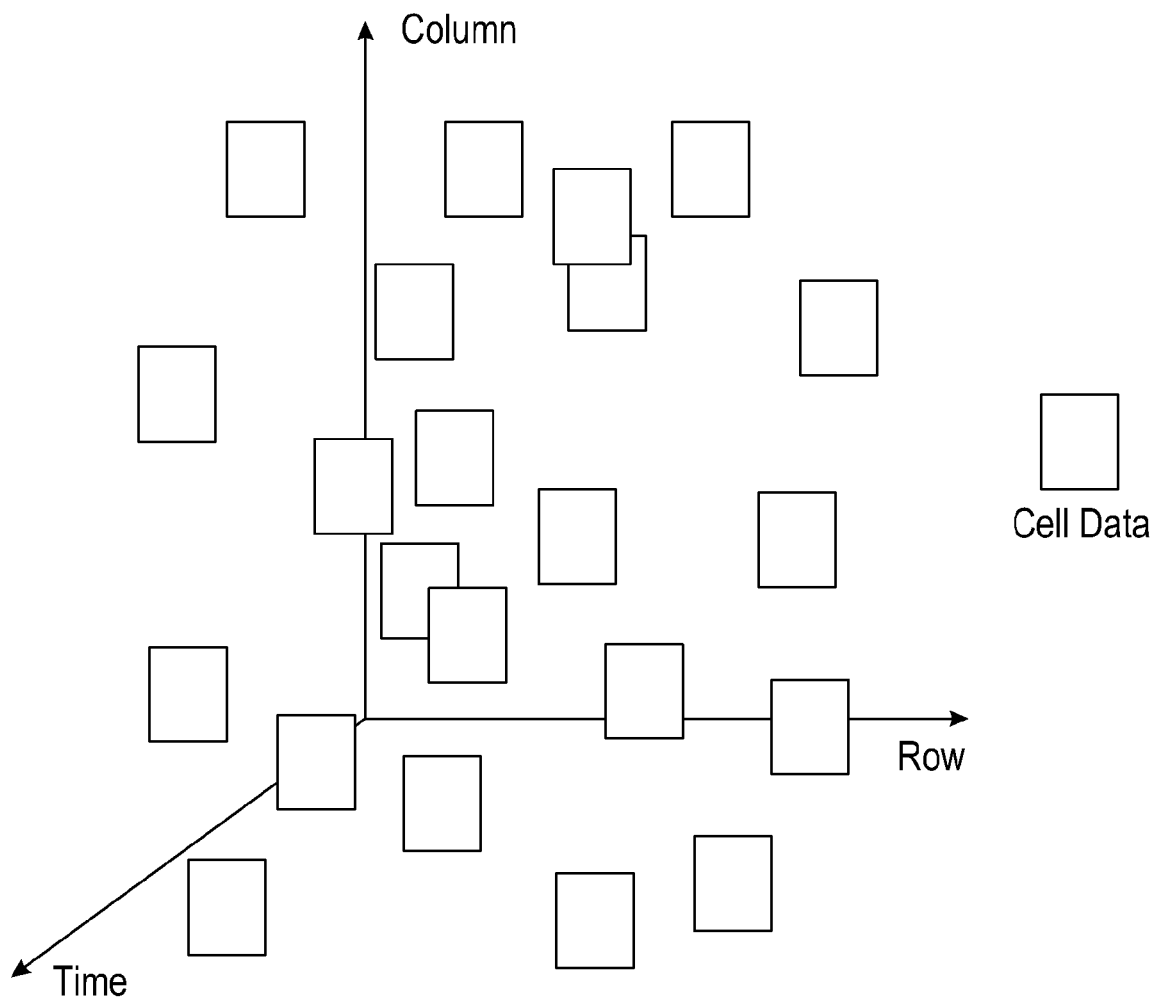
FIG. 2 is a schematic diagram illustrating one embodiment of the structure of a spreadsheet file content of the present change oriented spreadsheet application.

FIG. 2 illustrates the content of a file of the change oriented spreadsheet application according to one embodiment of the present invention. As shown, basic data units of a spreadsheet file of the change oriented spreadsheet application according to the present invention reside in a three-dimensional space <row, column, time>, wherein "row" represents the row number in the spreadsheet, "column" represents the column number in the spreadsheet, and "time" represents the time point associated with the cell.

Methods for data organization, query and presentation of the change oriented spreadsheet application.

The first aspect of the present invention relates to a data organization method for implementing the change oriented spreadsheet application with high performance.

In order to save storage space, at each time point, the change oriented spreadsheet application only records the updates actually occurring at the time point. If at a certain time point, no valid update occurs to a certain cell, the content of the cell at the time point will not be recorded in the data structure of the change oriented spreadsheet application. In this case, the current value of the cell at this time point should be the valid update to the cell occurring the most immediately before the time point, or the original data of the cell. To this end, in an embodiment of the present invention, the cell structure of the spreadsheet file can be implemented as a "compressed matrix".

Meanwhile, the data organization method for the change oriented spreadsheet application should be efficient. For operations such as file loading, file storing, updates recording, and changes querying, efficiency is very important. These operations include two kinds of basic operations, i.e., inserting a piece of record and querying based on a given cell position and time point. Therefore, the data organization method for the change oriented spreadsheet application according to the present invention will be improved primarily in these two respects.

What is the most important in the data organization of the change oriented spreadsheet application is to find a suitable data structure to store all the changes. Usually, a spreadsheet file of a spreadsheet application is implemented as sparse vectors or sparse tables to store the cell collection. Thus, for the change oriented spreadsheet application, update data needs to be added into such a spreadsheet structure.

Figure 3:
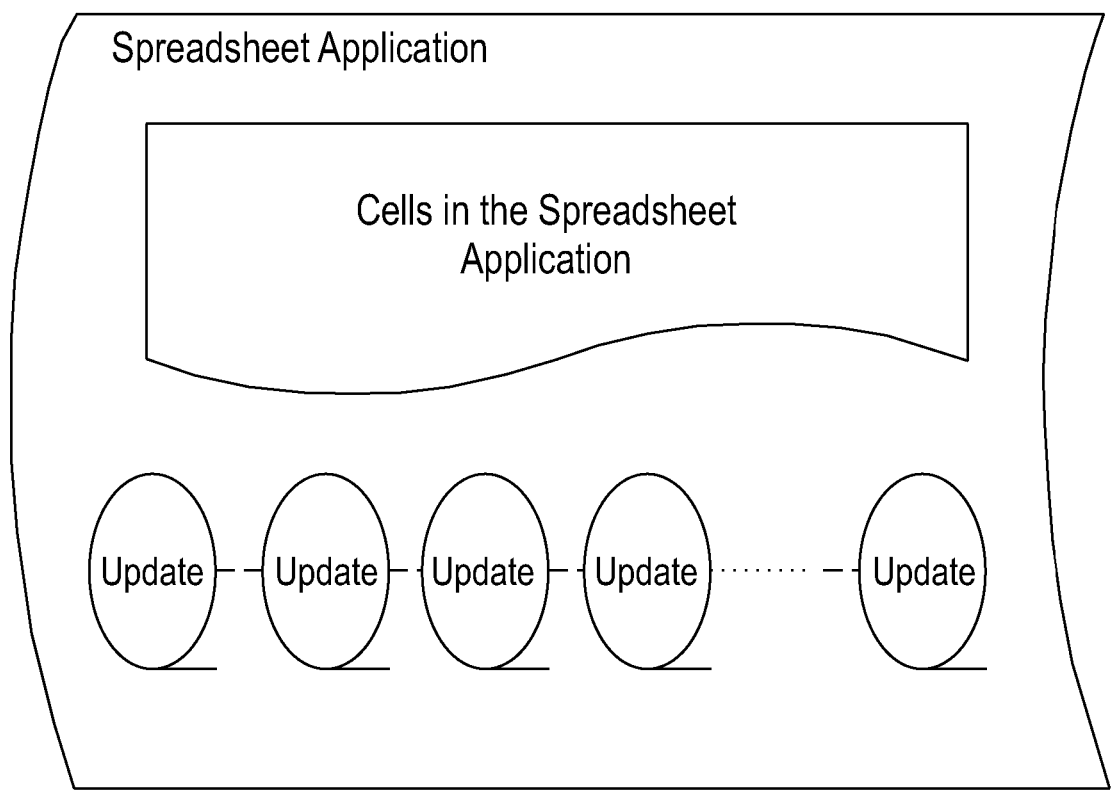
FIG. 3 is a schematic diagram illustrating one embodiment of the a data organization for implementing the present change oriented spreadsheet application.

To realize the function of a change oriented spreadsheet, one approach might be storing all updates together independently of the conventional cell contents, as shown in FIG. 3. This approach is fast for update insertion, but slow for update querying. But in fact, both update insertion and update querying operations are important in the change oriented spreadsheet application.

Therefore, updates in the change oriented spreadsheet application should be organized well into a certain kind of structured dataset. Such a structured dataset should be refreshed easily when a new update is added, and should have a high performance in update querying, and have a high performance even in initialization as well. Thus, the core function in the data organization method for the change oriented spreadsheet application is such a structured dataset, and the method for updating the dataset and the method for performing queries on the dataset. And the measure for evaluating a data organization method for the change oriented spreadsheet application is the performances of data updating and dataset querying.

The basic idea for constructing such a structured dataset is to use indexed and ordered data. Besides, another good choice may be a more complex data structure containing such valid updates.

In the required update query method, valid updates can be queried according to timestamps, cells or a combination thereof. And one of these two kinds of querying indexes should be used according to different user requirements.

1. The data organization method for the change oriented spreadsheet application according to one embodiment of the invention.

Figure 4:
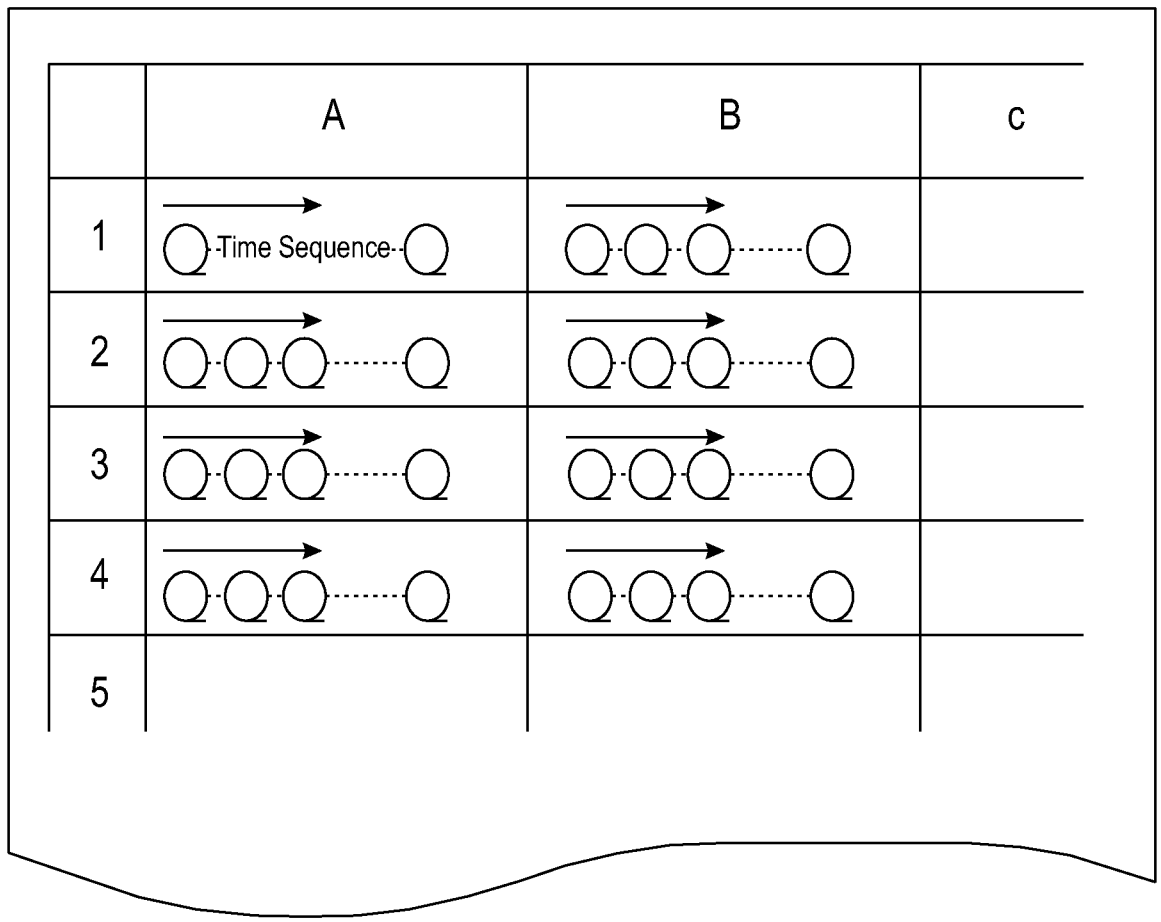
FIG. 4 is a schematic diagram illustrating one embodiment of the data organization for the present change oriented spreadsheet application.

FIG. 4 illustrates a data organization method for the change oriented spreadsheet application according to one embodiment of the present invention, that is, a data structure for recording valid updates in the change oriented spreadsheet application. As shown, in this data structure, valid updates are associated with their respective cells, and multiple valid updates form a valid update sequence associated with the respective cell. Whenever any change to a cell is deemed a valid update, a new update and the update time is added into the valid update sequence. This valid update sequence is ordered by update times. Further, to realize high insertion and querying efficiency, the valid update sequence can be implemented as a red-black tree.

It should be noted that FIG. 4 is exemplary and therefore is only for illustration and description purposes.

In FIG. 4 the valid update sequence is shown to be within each cell. Those skilled in the art will readily understand that this is only one method for realizing the association between cells and their respective valid update sequence, and a variety of other methods such as pointers can be used to realize the association between each cell and its valid update sequence.

It should also be noted that this data structure can be either stored in the main memory of the computer system, or be stored in an external storage device.

Figure 5:
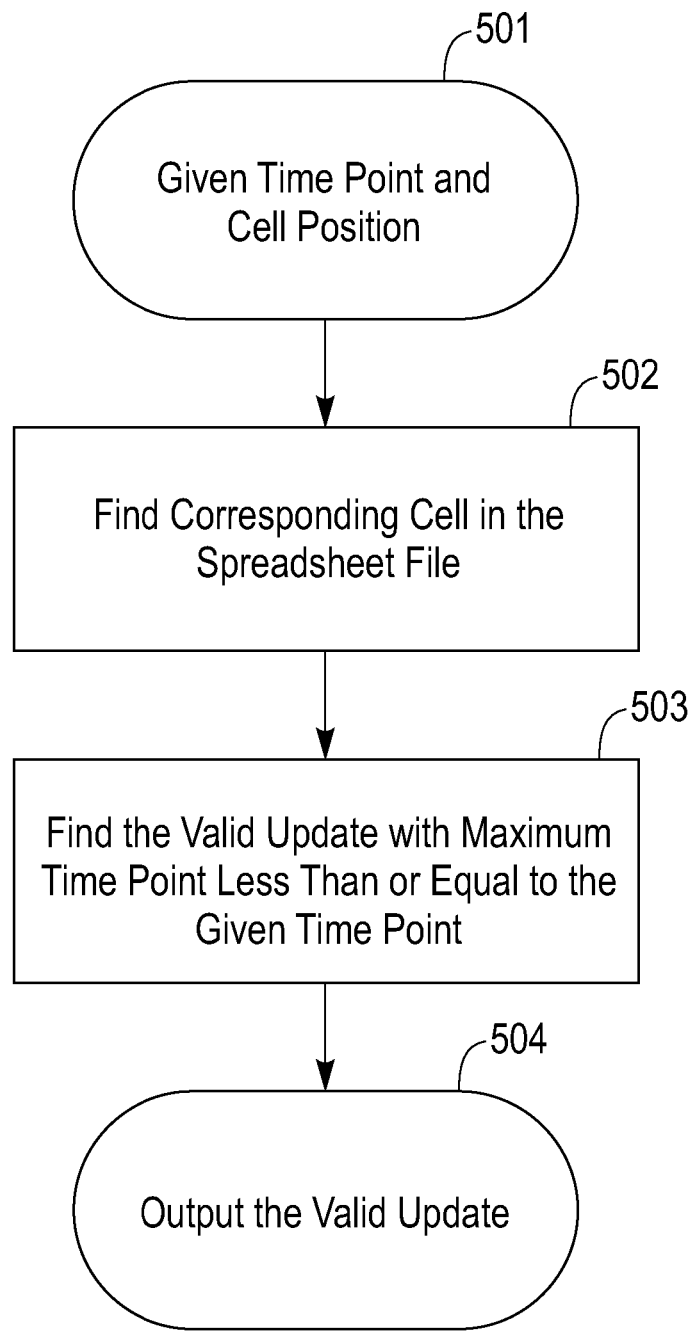
FIG. 5 is a flow diagram of the basic query method based on the data organization method as shown in FIG. 4.

FIG. 5 shows a flow diagram of a basic query method based on the data organization of the embodiment shown in FIG. 4. The basic query operation queries the current value of a given cell at a given time point in a spreadsheet file of the change oriented spreadsheet application.

As shown, in step 501, a given time point and cell position are obtained. In step 502, the cell corresponding to the cell position is found in the spreadsheet file. In step 503, the valid update having the maximum time point less than or equal to the given time point is found in the valid update sequence associated with the cell. In step 504, the valid update is outputted as the current value of the cell at this time point, and the method ends.

Assume the step 502 in FIG. 5 has time complexities Oa(average) and Ow(worst) dependent on the original cell structure of the spreadsheet application. According to the characteristics of red-black trees, it can be known that the time complexity of step 503 is O(log 2N), wherein N is the number of valid updates in the sequence. Thus, the total time complexity is O(Oa+log 2N) and O(Ow+log 2N).

Figure 6:
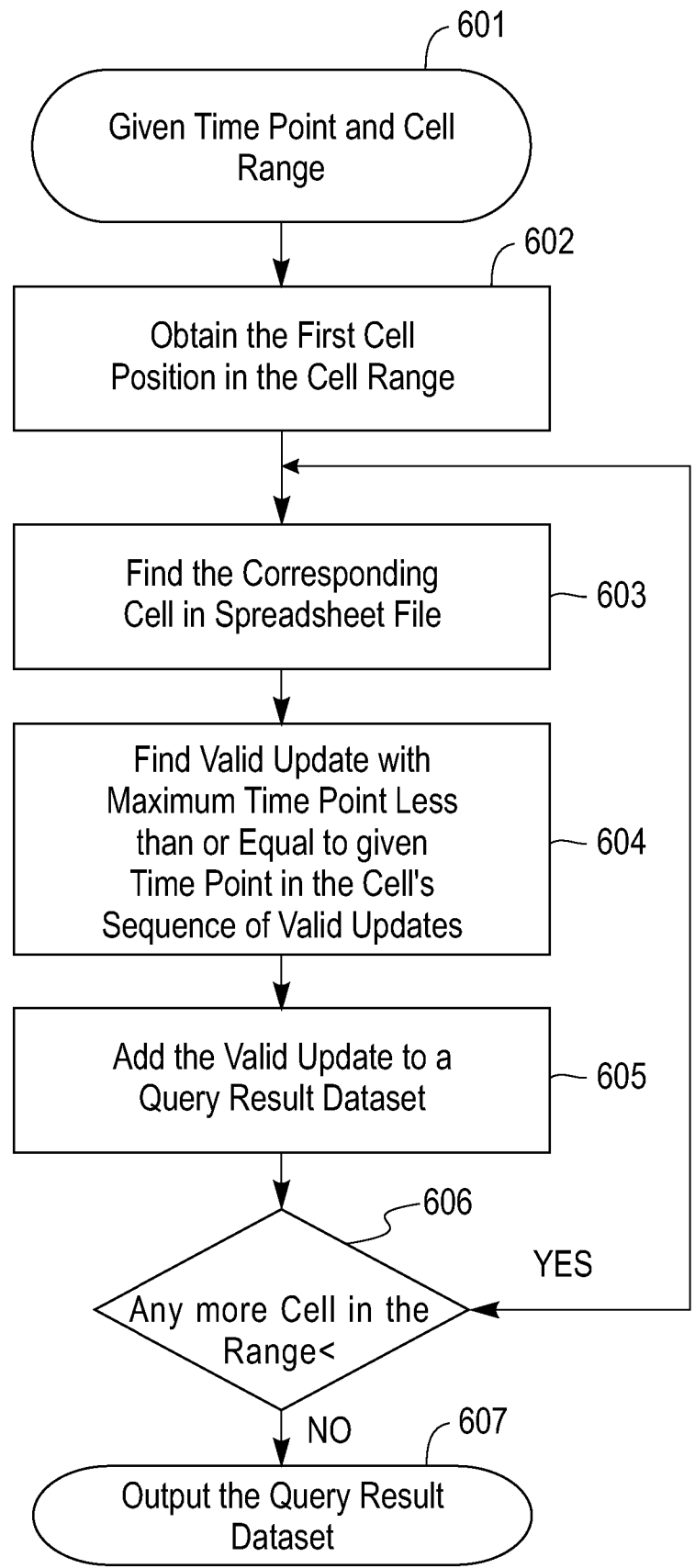
FIG. 6 is a flow diagram of a method for querying the current values of cells at a given time point and within a given cell range based on the data organization method as shown in FIG. 4.

FIG. 6 further illustrates a flow diagram of a method for querying the current values of cells at a given time point and within a cell range. As shown, in step 601, the given time point and cell range is obtained. In step 602, the first cell position in the cell range is obtained. In step 603, the corresponding cell is found in the spreadsheet file. In step 604, the valid update having the maximum time point less than or equal to the given time point is found in the sequence of valid updates associated with the cell. In step 605, the valid update is added into a query result dataset. In step 606, it is determined whether there is any other unprocessed cell position. If YES, the method returns to perform step 603 iteratively. If NO, the query result dataset is outputted in step 607, and the method ends.

The outputted query result dataset can be further used to generate and present the snapshot of the spreadsheet file at the given time point and within the given cell range. The snapshot represents the current state of the spreadsheet file at the given time point and within the given cell range (e.g., the whole cell range).

Figure 7:
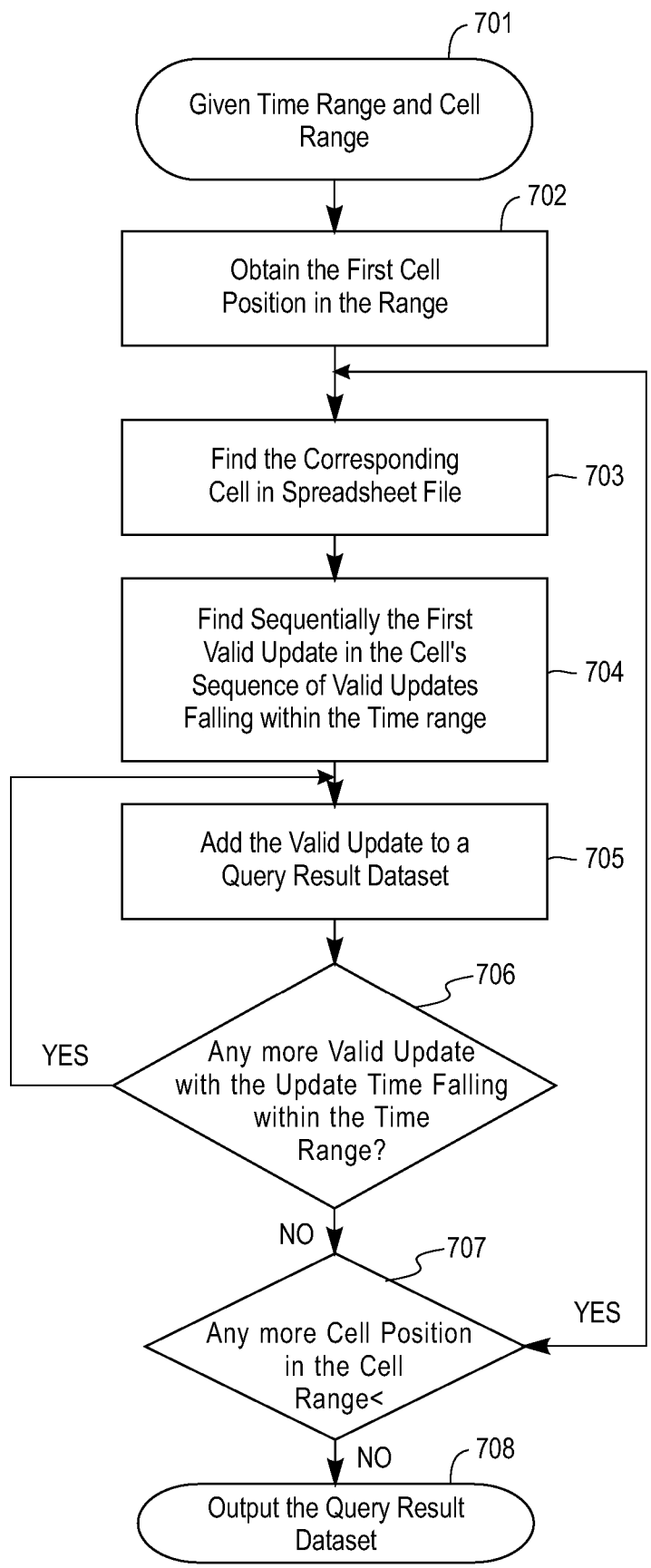
FIG. 7 is a flow diagram of a method for querying the valid updates according to a given cell range and time range based on the data organization method as shown in FIG. 4.

FIG. 7 illustrates a flow diagram of a method for querying the valid updates according to a given cell range and time range based on the data organization of the embodiment of FIG. 4. As shown, in step 701, the given time range and cell range are obtained. In step 702, the first cell position in the given cell range is obtained. In step 703, the corresponding cell is found in the change oriented spreadsheet file. In step 704, the first valid update falling within the time range is found sequentially in the sequence of valid updates associated with the cell. In step 705, the valid update is added into a query result dataset. In step 706, it is determined whether there is any more valid update in the sequence of valid updates that falls within the time range. If YES, the method returns to perform step 705 iteratively. If NO, the method proceeds to step 707, where it is determined whether there is any other unprocessed cell position in the cell range. If there is, the method returns to perform step 703 iteratively. If there is not, the method outputs the query result dataset in step 708, and the method ends.

It is to be noted that the above mentioned cell range can be either a continuous time range, or multiple non-continuous time ranges, or one or more time points. Similarly, the above mentioned cell range can be either a continuous cell range, or multiple non-continuous cell ranges, or one or more cell positions. When the time range is a time point, the query method as shown in FIG. 7, unlike the method for querying the current value of cells at a given time point as shown in FIGS. 5 and 6, is used to query the valid updates actually occurring at the time point.

The outputted query result dataset represents the time-related historical information of the spreadsheet file within the given cell range, which historical information records the changes to the spreadsheet file within the specified area in a period of time, and can be used as the data source for a data analysis function in the spreadsheet application, such as used as input to formulas, used for regression analysis etc., and can be represented in charts or in other apparent manners. For example, a chart representing the historical information of the contents of cells can be generated using the update occurrence times as the abscissa and the updated cell contents as the ordinate.

Assume the step 703 in FIG. 7 has time complexities Oa(average) and Ow(worst) dependent on the original cell structure of the spreadsheet application, and N is the number of valid updates in the sequence, M is the number of cells in the selected cell range. According to the characteristics of red-black trees, it can be known that the time complexity of step 704 is O(log 2N), and the time complexities of step 705, 706 is O(N). Thus, the total time complexity is (Oa+O(log 2N)+O(N))*M and (Ow+O(log 2N)+O(N))*M.

Figure 8:
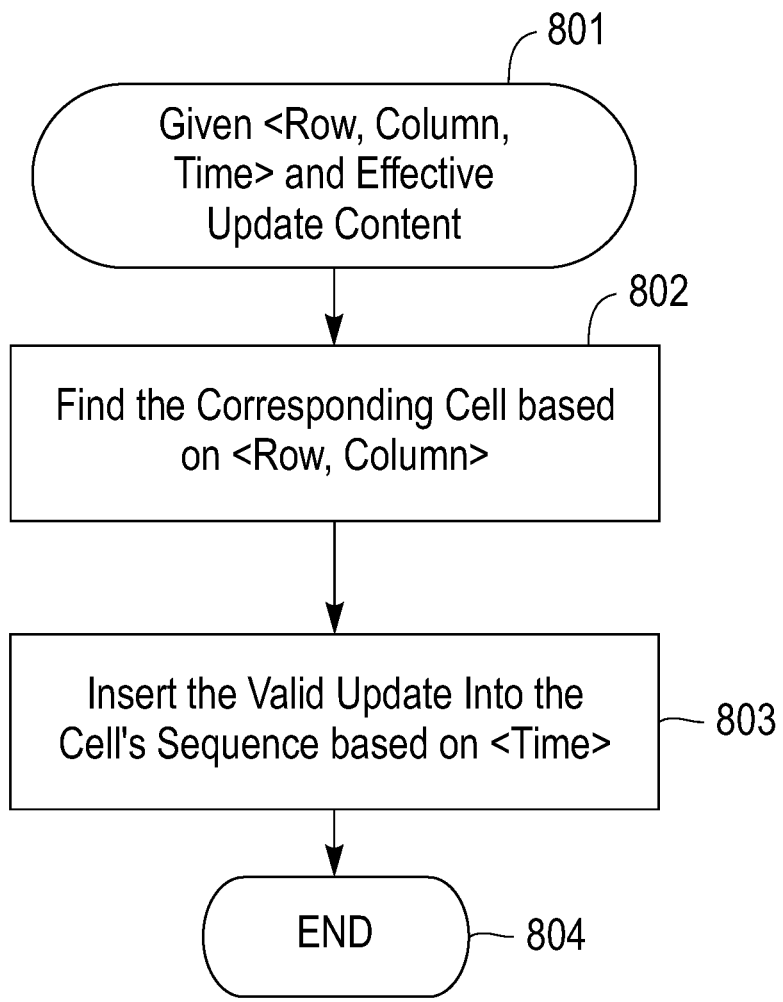
FIG. 8 is a flow diagram of a method for inserting an valid update based on the data organization method as shown in FIG. 4.

FIG. 8 illustrates a flow diagram of a method for inserting an valid update based on the data organization according to the embodiment of FIG. 4. As shown, in step 801, the given <row, column, time> and the content of the valid update are obtained. In step 802, the corresponding cell is found in the spreadsheet file according to the <row, column>. In step 803, the content of the valid update is inserted in the sequence of valid updates associated with cell. In step 804, the method ends.

The total time complexity of this method is O(Oa+log 2N) and O(Ow+log 2N).

Figure 9:
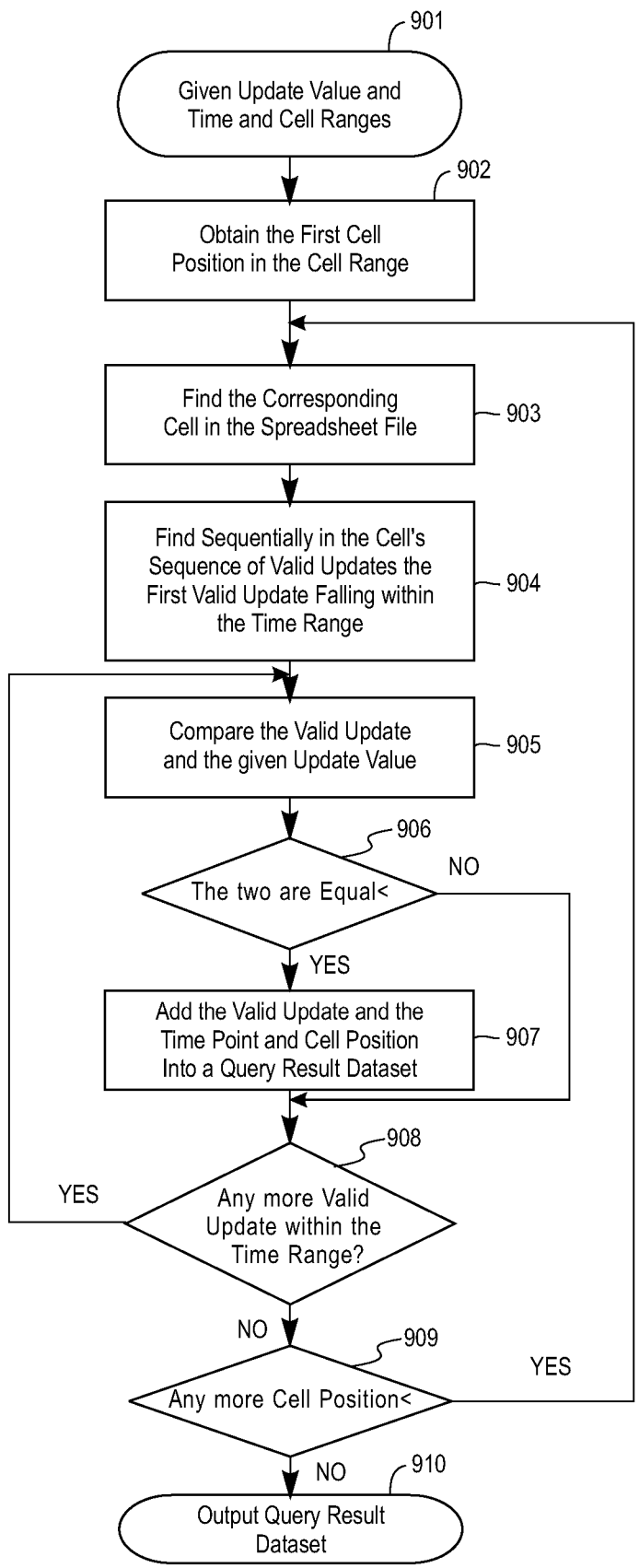
FIG. 9 is a flow diagram of a method for querying the time points and cell positions <row, column, time> of the cells having a given update value based on the data organization method as shown in FIG. 4.

FIG. 9 illustrates a flow diagram of a method for querying the time point and cell position <row, column, time> of the data cells with a given valid update value based on the data organization according to the embodiment of FIG. 4. As show, in step 901, the valid update to be queried and the time period and cell range of the query are obtained. In step 902, the first cell position in the cell range is obtained. In step 903, the corresponding cell is found in the spreadsheet file of the change oriented spreadsheet application. In step 904, the first valid update falling within the time period is found sequentially in the sequence of valid updates of the cell. In step 905, the valid update and the update value to be queried is compared. In step 906, it is determined whether the two are equal. If YES, the method proceeds to step 907, where the valid update and its time point and cell position are added into a query result dataset. Then, in step 908, it is determined whether there is any more valid update falling within the time period. If it is determined in step 906 that the two are not equal, the method skips step 907, and proceeds directly to step 908. If the determination in step 908 is YES, the method returns to perform step 906 iteratively, comparing the next valid update and the update value to be queried. If the determination in step 908 is NO, the method proceeds to step 909, determining whether there is any more cell position in the given cell range. If the determination is YES, the method returns to perform step 903 iteratively, carrying out the same operations as above for the next cell. If the determination is NO, the query result dataset is outputted, and the method ends.

The generated query result dataset can be presented to the user in an appropriate manner such as in the form of charts or be further processed otherwise.

It should be understood by those skilled in the art that the method for querying the time points and cell positions of the data cells with a given valid update value is only a particular instance of the general method for querying the time points and cell positions of the data cells satisfying arbitrary query conditions. For example, the user can query the time points and cell positions of all the data cells having an valid update more than a certain value.

Since the data organization method according to the embodiment of FIG. 4 uses cell positions as the primary index for valid updates, and the valid updates of the same cell are arranged in the order of time, it is faster for queries according to a single cell position and time range. In this case, only one cell search and one time search is needed. When querying according to a given cell range and a single time point, multiple search in the time sequence will be needed, thus the performance efficiency would be low.

2. Data organization method for the change oriented spreadsheet application according to another embodiment of the present invention.

Figure 10:
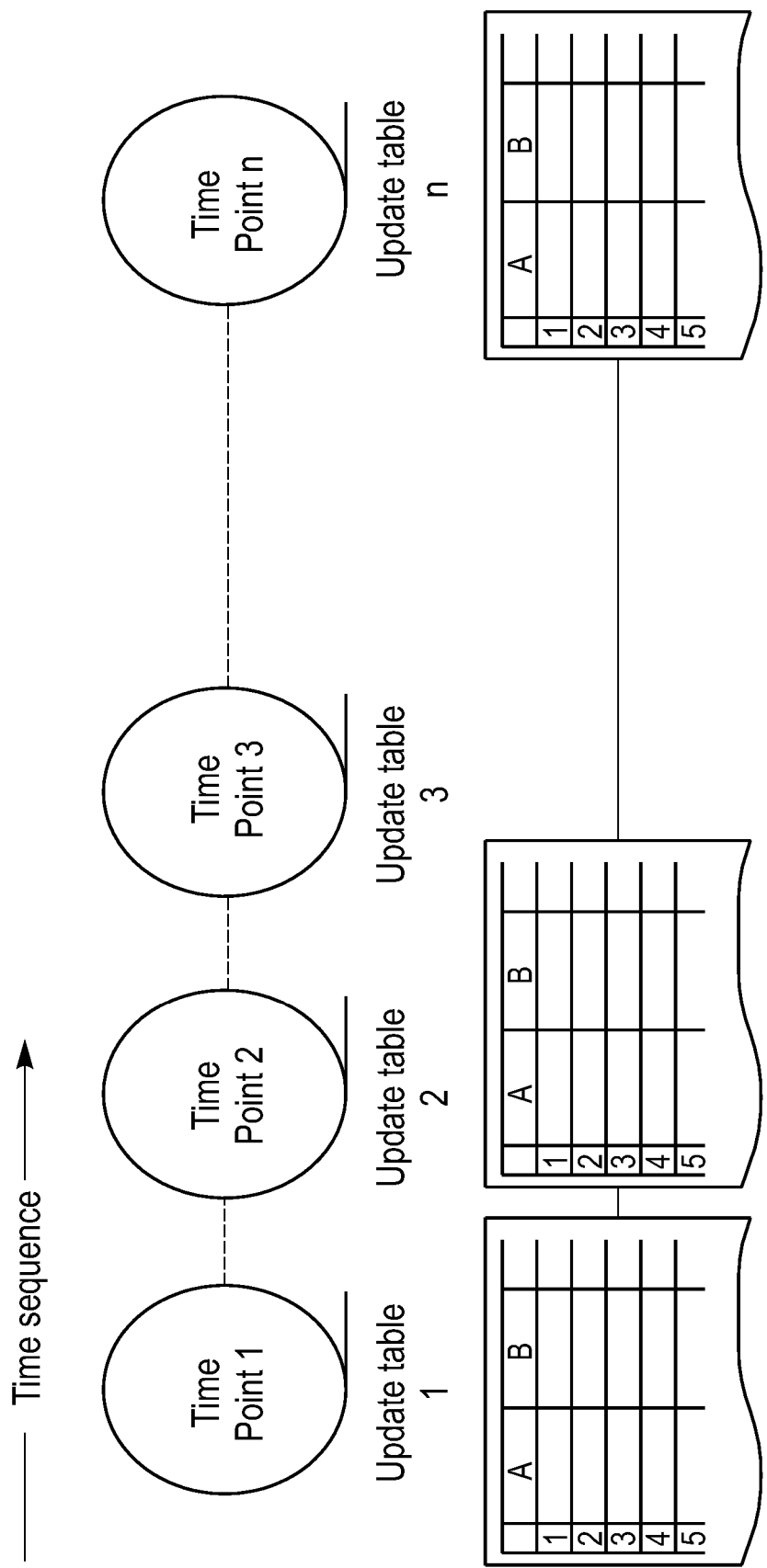
FIG. 10 is a schematic diagram illustrating another embodiment of the data organization method for the present change oriented spreadsheet application.

FIG. 10 illustrates the data organization method for the change oriented spreadsheet application according to another embodiment of the present invention. The method collects all updates at a time point together to form an update table. Each time point at which the user records updates has a single table. All these update table has the similar data structure to the spreadsheet file, such as sparse vectors or sparse tables. Only updates at a given time point is recorded in the update table. The update table at all the time points form a sequence implemented by a red-black tree.

Figure 11:
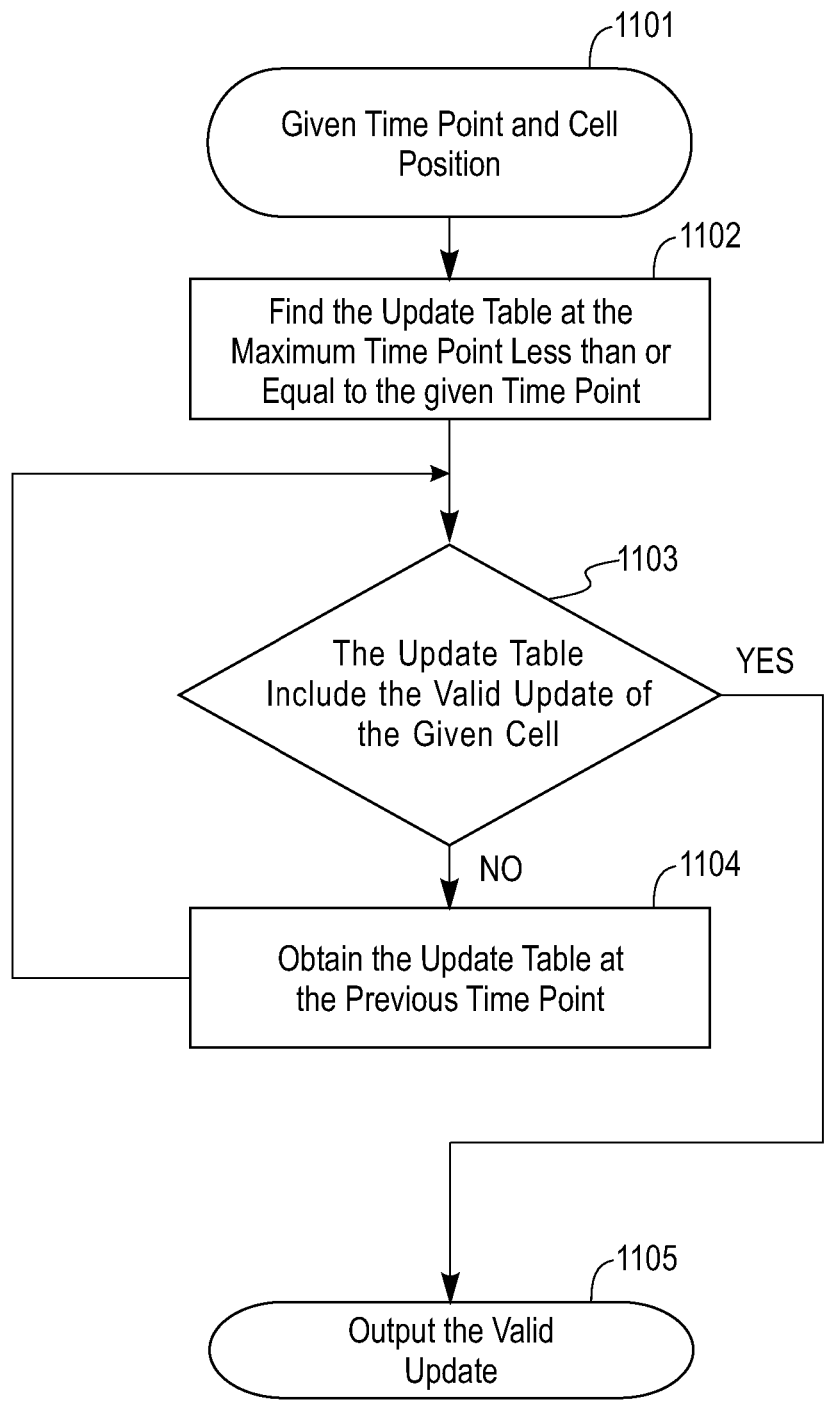
FIG. 11 is a flow diagram of the basic data query method based on the data organization method as shown in FIG. 10.

It should be noted that FIG. 10 is exemplary and thus for illustration and description purposes. And as will be understood by those skilled in the art, the data organization method, that is, the data structure, can be implemented in one of a variety of ways, all of which are within the scope of the present invention; and this data structure can be either stored in the main memory of the computer system, or be stored in an external storage device. FIG. 11 illustrates a flow diagram of a basic query operation based on the data organization according to the embodiment of FIG. 10. The basic query operation queries the current value of a given cell at a given time point in a spreadsheet file of the change oriented spreadsheet application. As shown, in step 1101, the given time point and the cell position are obtained. In step 1102, the update table at the maximum time point less than or equal to the given time point is found. In step 1103, it is determined whether the update table contain an valid update of the given cell. If the determination is YES, the method proceeds to step 1105, where the valid update is outputted as the current value of the cell at the time point, and the method ends. If the determination in step 1103 is NO, the update table at the previous time point is obtained iteratively, and the determination in step 1103 is performed again, until the determination is YES, and the valid update of the given cell in the update table is outputted as the current value of the cell at the time point (or all the previous update tables have been traversed, and none of them contains an valid update of the given cell, in which case a null value is outputted), and the method ends.

Since only updates at a given time point are recorded in the update table, if no update record of a specified cell is found at a time point, the update tables prior to the time point should be searched iteratively, until an update record of the specified cell is found. Assume updates exist in each position of N time points with the same probability, the total average time complexity will be $Oa^4 O(N)+O(\log 2N)=Oa^4 O(N)$, and the worst time complexity will be $Ow^4 O(N)$.

Figure 12:
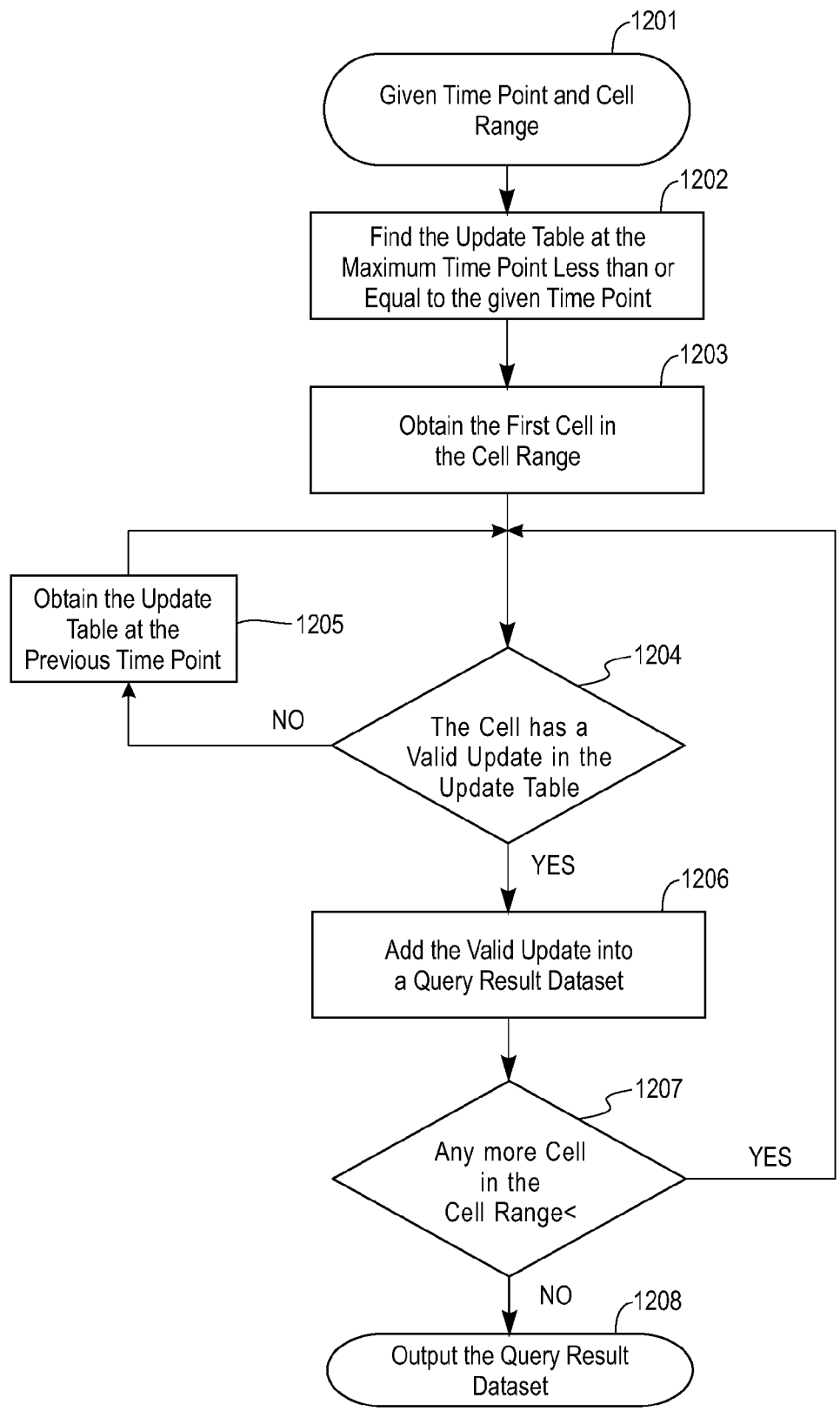
FIG. 12 is a flow diagram of a method for querying the current values of cells at a given time point and within a given cell range based on the data organization method as shown in FIG. 10.

FIG. 12 further illustrates a flow diagram of a method for querying the current values of cells at a given time point and within a cell range based on the data organization according to the embodiment of FIG. 10. As shown, in step 1201, the given time point and cell range are obtained. In step 1202, the update table at the maximum time point equal to or less than the given time point is found in the spreadsheet file of the change oriented spreadsheet application. In step 1203, the first cell in the cell range is obtained. In step 1204, it is determined whether the cell has an valid update in the update table. If the determination is YES, the method proceeds to step 1206, where the valid update of the cell is added into a query result dataset. If the determination is NO, the method proceeds to step 1205, where the update table at the previous time point is obtained. Then the method returns to perform step 1204 iteratively, determining again whether the cell has an valid update in the update table at this previous time point, until an valid update or the original data (which can be a null value) of cell is found in a previous update table. Then in step 1207, it is determined whether there is any other unprocessed cell in the given update table. If the determination is YES, the method returns to perform step 1204 iteratively, repeating the above steps. If the determination is NO, the query result dataset is outputted in step 1208, and the method ends.

The above mentioned query result dataset can be further used to generate and present a snapshot of the spreadsheet file at the given time point and within the given cell range. The snapshot represents the current state of the spreadsheet file at the given time point and within the given cell range (e.g., the whole cell range).

Figure 13:
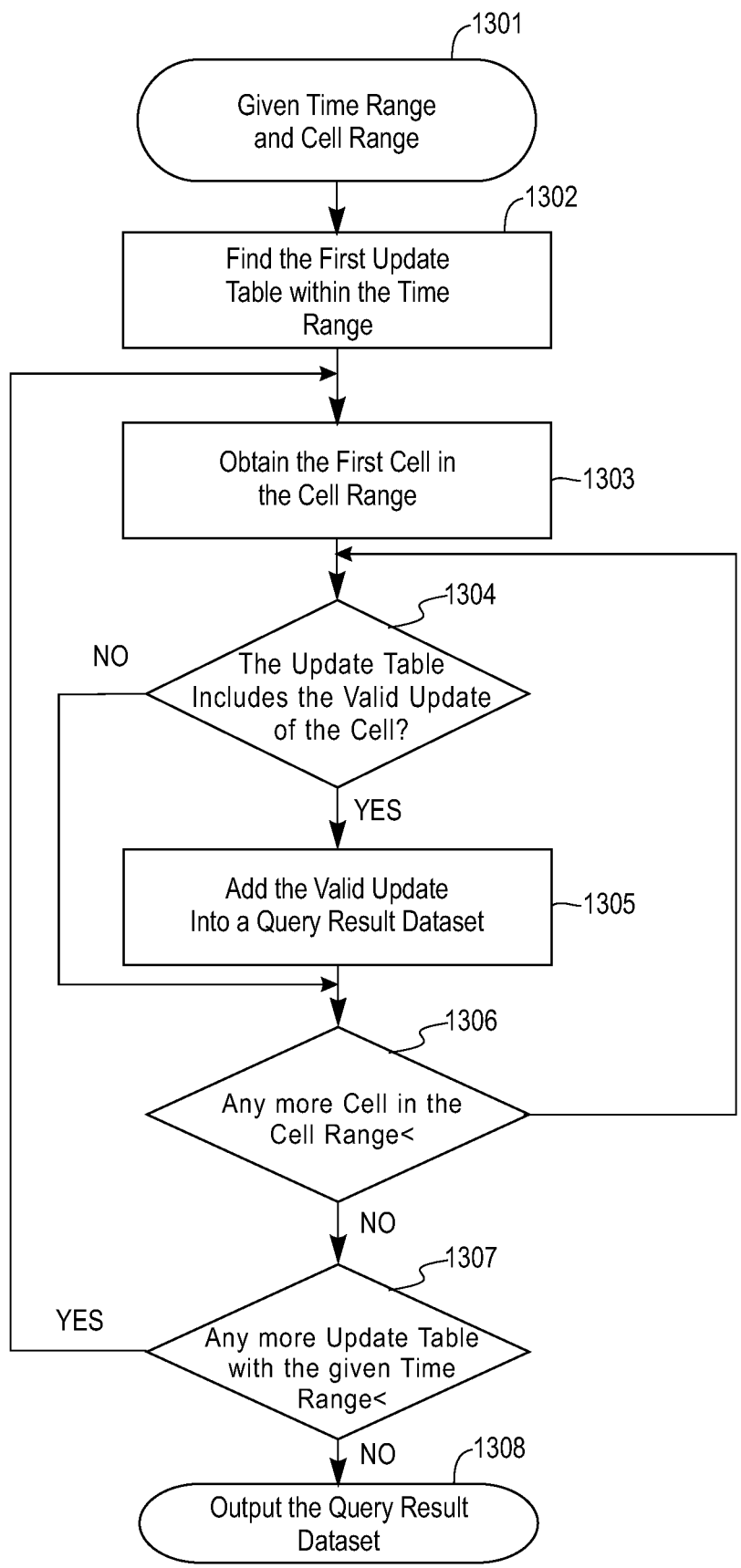
FIG. 13 is a flow diagram of a method for querying the valid updates according to a given cell range and time range based on the data organization method as shown in FIG. 10.

FIG. 13 illustrates a flow diagram of a method for querying valid updates according to a given cell range and time range based on the data organization according to the embodiment of FIG. 10. As shown, in step 1301, the given time range and cell range are obtained. In step 1302, the first update table with the time point falling within the given time range is found sequentially in the spreadsheet file of the change oriented spreadsheet application. In step 1303, the first cell in the cell range is obtained. Then, in step 1304, it is determined whether the update table contains an valid update of the cell. If the determination is YES, the method proceeds to step 1305, where the valid update of the cell is added into a query result dataset. Then the method proceeds to step 1306. If the determination in step 1304 is NO, the method skips the step 1306, going directly to step 1306. In step 1306, it is determined whether there is any other unprocessed cell in the cell range. If the determination is YES, the method returns to perform step 1304 iteratively. If the determination is NO, the method proceeds to step 1307, where it is determined whether there is any other update table with the time point falling within the given time range. If the determination is YES, the method returns to perform step 1303 iteratively, performing the above steps with the other update table. If the determination is NO, the query result dataset is outputted, and the method ends.

As described above, the time range can be either a continuous time range, or multiple non-continuous time ranges, or one or more time points. Similarly, the cell range can be either a continuous cell range, or multiple non-continuous cell ranges, or one or more cell positions. When the time range is time points, unlike the method for querying the current value of a cell at a given time point as shown in FIGS. 11 and 12, the query method as shown in FIG. 13 is used for querying the valid update actually occurring at the time point.

As described above, the outputted query result dataset represents the time-related historical information of the spreadsheet file within the given cell range, which can be used as the data source for data analysis functions in the spreadsheet application, such as the input to formulas, or for regression analysis, etc., and the historical information can also be presented in charts or other apparent manners. For example, the charts representing the historical information of cells can be generated by using the updates occurrence times as the abscissa and updated cell contents as the ordinate.

Figure 14:
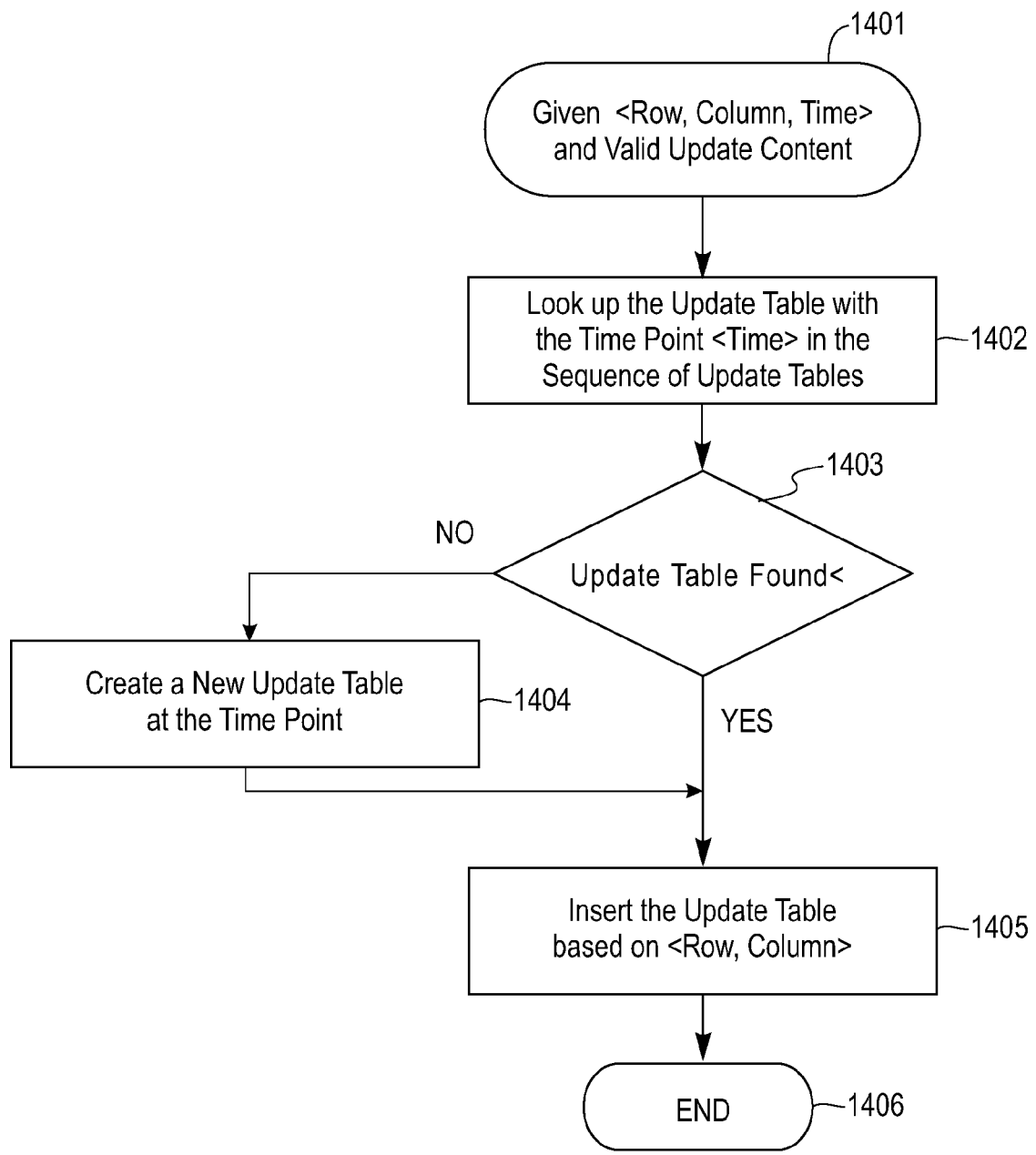
FIG. 14 is a flow diagram of a method for inserting an valid update based on the data organization method as shown in FIG. 10.

FIG. 14 illustrates a flow diagram of a method for inserting an valid update based on the data organization according to the embodiment of FIG. 10. As shown, in step 1401, the given <row, column, time> where the valid update is to be inserted and the valid update content to be inserted are obtained. In step 1402, the update table with the time point <time> is looked up in the sequence of update tables of the spreadsheet file of the change oriented spreadsheet application. In step 1403, it is determined whether such an update table is found. If the determination is YES, the method proceeds to step 1405, where the valid update content is inserted into the update table according to the <row, column>. If the determination is NO, the method proceeds to step 1404, where a new update table at the time point is created. The content of the new update table is initially null. The method then proceeds to step 1405, where the valid update content is inserted into the newly created update table according to the <row, column>. The method ends at step 1406.

The time complexity of this insertion operation is $Oa+O(\log 2N)$ and $Ow+O(\log 2N)$.

Figure 15:
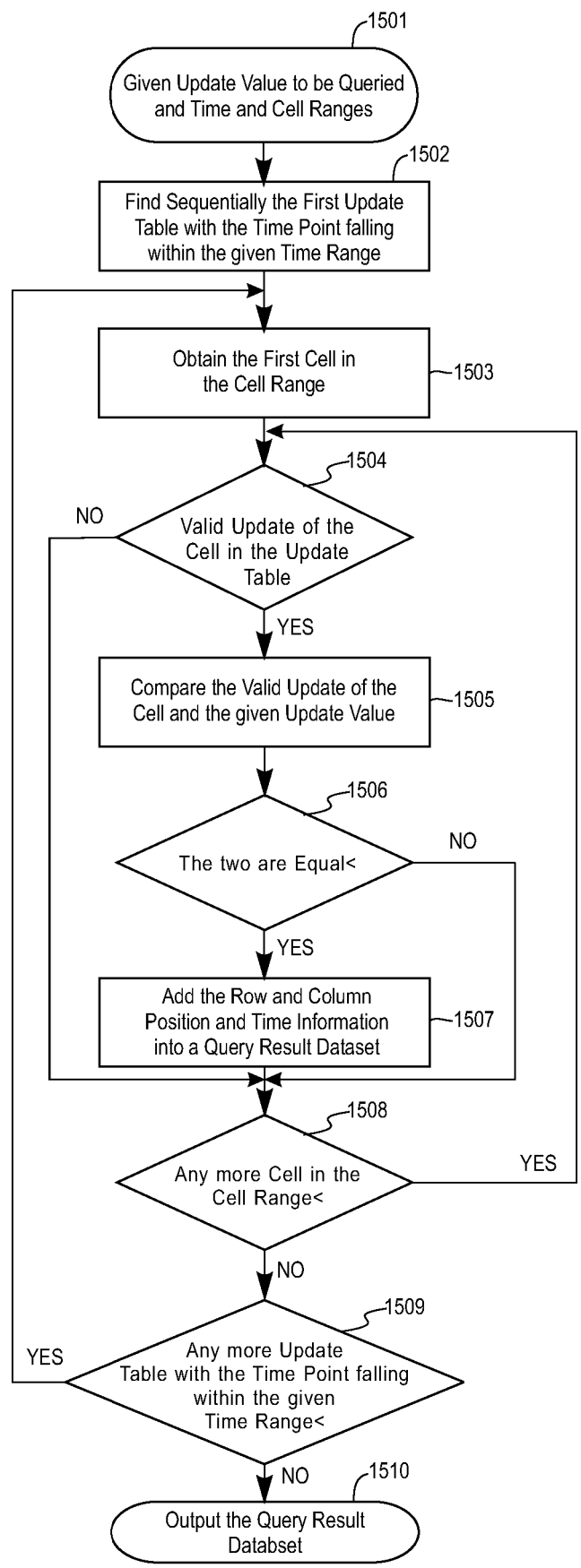
FIG. 15 is a flow diagram of a method for querying the time points and cell positions <row, column, time> of the cells having a given update value based on the data organization method as shown in FIG. 10.

FIG. 15 illustrates a flow diagram of a method for querying the time points and cell positions <row, column, time> of the data units having a given update value based on the data organization according to the embodiment of FIG. 10. As shown, in step 1501, the update value to be queried and the time range and cell range are obtained. In step 1502, the first update table with the time point falling within the given time range is found sequentially in the spreadsheet file of the change oriented spreadsheet application. In step 1503, the first cell in the cell range is obtained. In step 1504, it is determined whether there is an valid update of the cell in the update table. If the determination is YES, the method proceeds to step 1505, where the valid update of the cell and the given update value is compared. Then in step 1506, it is determined whether the two are equal. If the determination is YES, i.e., the two are equal, the row and column position and time point information of the valid update are added into a query result dataset in step 1507, and the method proceeds to step 1508. if the determination in step 1506 is NO, i.e., the two are not equal, the method skips step 1507, going directly to step 1508. If the determination in step 1504 is NO, i.e., there is no valid update of the cell in the update table, the method also goes directly to step 1508. In step 1508, it is determined whether there is any other unprocessed cell in the cell range. If the determination is YES, the method returns to perform step 1504 iteratively, repeating the above steps with the other cell. If the determination is NO, i.e., there is no longer any other cell in the update table falling within the cell range, the method proceeds to step 1509, where it is determined whether there is any other update table with the time point falling within the given time range. If the determination is YES, the method returns to perform step 1503 iteratively, repeating the above steps with the other update table. If the determination is NO, i.e., all the update tables falling within the time range have been processed, the query result dataset is outputted in step 1510, and method ends.

The obtained query result dataset can be presented to the user in an appropriate manner such as in the form of a chart or be further processed otherwise.

It should be understood that the method for querying the time points and cell positions of the data units having a given valid update as shown in FIG. 15 is only a particular instance of the general method for querying the time points and cell positions of the data units meeting arbitrary query conditions. For example, the user can query the time points and cell positions of all the data units with an valid update more than a value.

Since in the data organization method according to the embodiment of FIG. 10, valid updates have the time points as the primary index, and all valid updates at the same time point are arranged in the order of cell positions, querying according to a single time point and a cell range is faster, when only a single cell search and a single time search are needed. But querying according to a single cell position and a time range needs multiple cell searches, thus is performed slower.

3. A data organization method for the change oriented spreadsheet application according to a third embodiment of the invention.

The data organization method, based on the embodiment of FIG. 4, performs well when querying a single cell position and a time range, while the data organization based on the embodiment of FIG. 10 performs well when querying a given cell range and a single time point. Neither is suitable for all situations. Therefore, we need to select the data organization method of an embodiment based on the application characteristics of the change oriented spreadsheet application.

Here we introduce an embodiment with the advantages of both the embodiments and performing well in all situations. This third embodiment simply maintains two data structures as described above in storage at the same time. In the first data structure, the valid updates of cells and the update times are stored with cell positions as the primary index, and all valid updates of the same cell are arranged in the order of time. In the second data structure, the valid updates of cells are stored with the time points of the valid updates of cells as the primary index, and all valid updates at the same valid update time point are organized into an update table, which has the same cell structure as the spreadsheet file. In the two data structure are stored pointers to the same update data, thus the update data can be indexed from both data structures.

It should be understood by those skilled in the art that there are a variety of ways to implement the above said data organization method, and they are all within the scope of the present invention, provided only that the implementation of the data organization method enables indexing the valid updates from both cell positions and time points. Moreover, as will be understood by those skilled in the art, the data structure implementing the data organization method can be stored either in the main memory of the computer system, or in an external storage.

When update records are to be queried, a more efficient way can be chosen automatically. For example, if a cell position is given, the search can be performed from the first data structure; and if a time point is given, the search can be performed from the second data structure.

This data organization method requires a little more storage space, but this is not a big question. Meanwhile, maintaining the synchronization of the two data structures may need more work.

Figure 16:
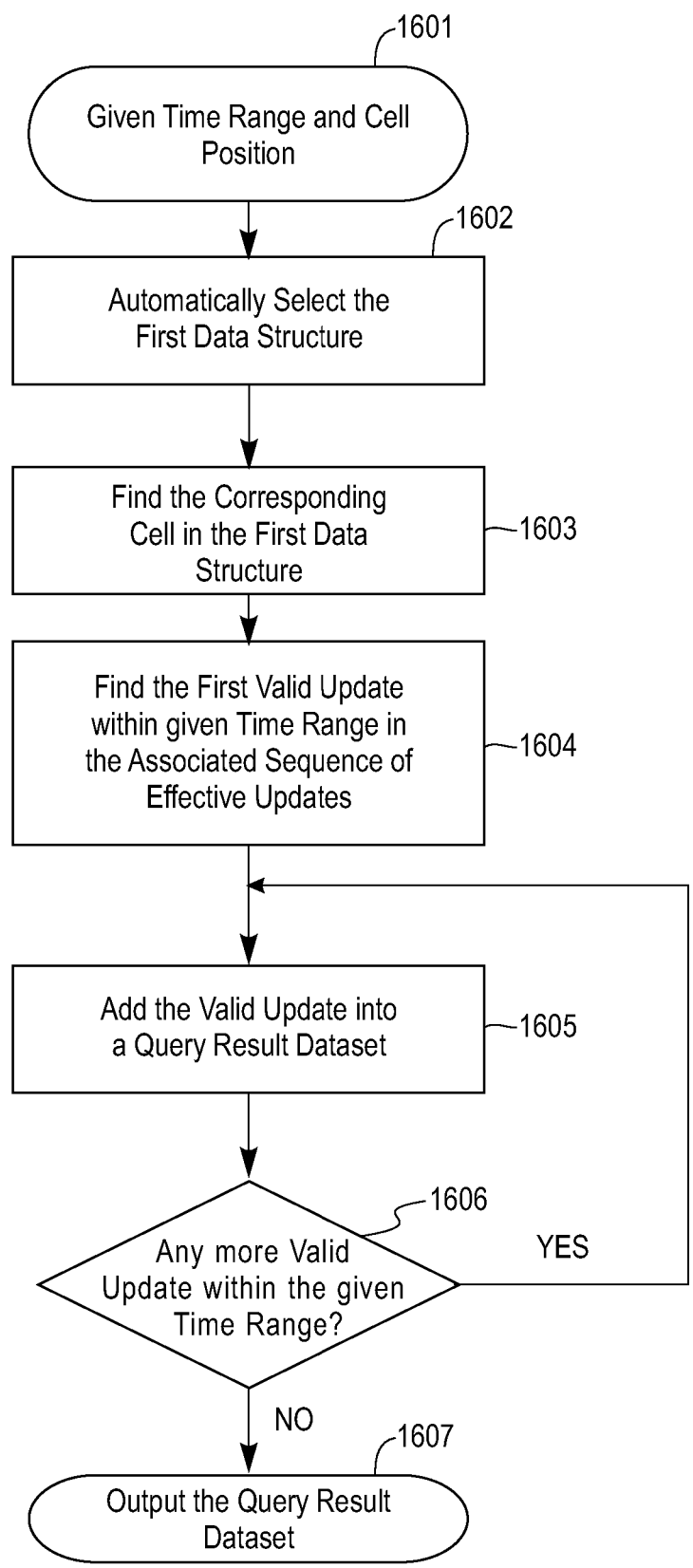
FIG. 16 is a flow diagram of an embodiment of a method for querying the valid updates to cells at a given cell position and within a time range.

FIG. 16 illustrates a flow diagram of a method for querying the valid updates of cells at a given cell position and within a time range based on the data organization according to a third embodiment of the present invention. As shown, in step 1601, the given time range and cell position are obtained. In step 1602, the change oriented spreadsheet application selects the first data structure according to the cell position. In step 1603, the cell corresponding to the cell position is found in the first data structure. In step 1604, the first valid update with the time point falling within the given time range is found sequentially in the sequence of valid updates associated with the cell. In step 1605, the valid update and the information of its cell position and time point are added into a query result dataset. In step 1606, it is determined whether there is any other valid update with the time point falling with the given time range. If the determination is YES, the method returns to perform step 1605. If the determination is NO, the method outputs the query result dataset.

Figure 17:
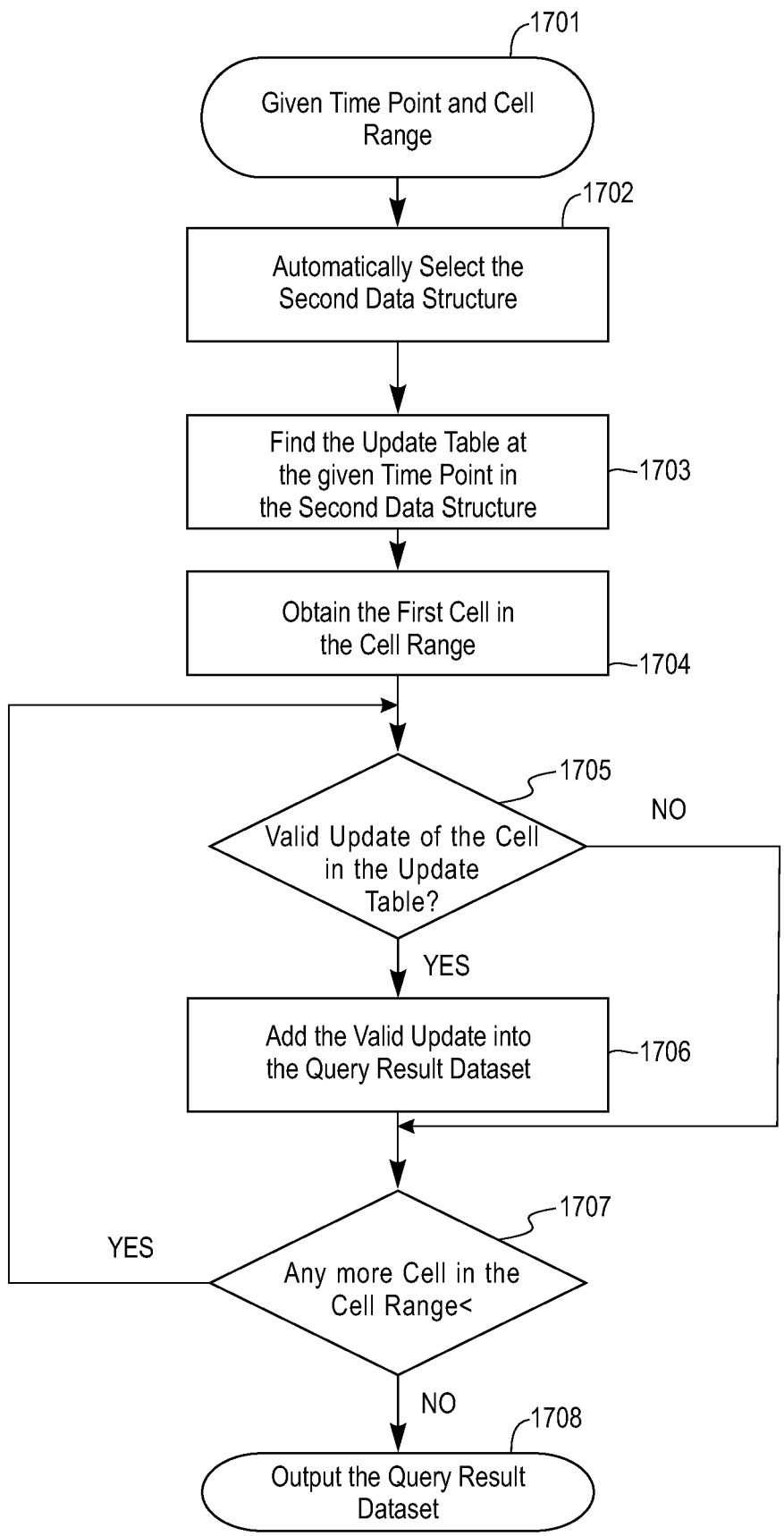
FIG. 17 is a flow diagram of an embodiment of a method for querying the valid updates to cells within a given cell range and at a time point.

FIG. 17 illustrates a flow diagram of an embodiment of a method for querying the valid updates of the cells within a given cell range and at a given time point. As shown, in step 1701, the given time point and cell range is obtained. In step 1702, the change oriented spreadsheet application selects automatically the second data structure according to the time point. In step 1703, the update table at the given time point is found out in the second data structure. In step 1704, the first cell in the cell range is obtained. In step 1705, it is determined whether there is the valid update of the cell in the update table. If the determination is YES, the valid update is added into a query result dataset. If the determination is NO, the method skips step 1706. Then it is determined in step 1707 whether there is any other unprocessed cell in the cell range. If the determination is YES, the method returns to step 1705, performing the above steps on the other unprocessed cell. If the determination is NO, the query result dataset is outputted in step 1705, and the method ends.

For other scenarios of the method for querying the valid updates of cells according to a given cell range and time range based on the data organization according the embodiments of FIGS. 16 and 17, such as when the cell range is a cell position and the time range is a time point, as well as when the cell range is a continuous cell range and the time range is a continuous time range, the change oriented spreadsheet application first selects the first data structure or the second data structure, and then querying in the selected data structure. For the details of the query method, reference can be made to FIGS. 7 and 13 and the above corresponding descriptions respectively. The selection of the first data structure or the second data structure can be made according to the characteristics of the given cell range and time range, or according to other criteria, or can be made arbitrarily.

The method for querying the current values of cells within a given cell range and at a given time point based on the data organization method according to the third embodiment of the present invention first selects the second data structure, and performs the method as shown in FIG. 12 and described herein above on the data structure.

The method for querying the time points and cell positions <row, column, time> of the data units with a given update value (or meeting any query conditions) based on the data organization method according to the third embodiment of the present invention first selects the first data structure or the second data structure, and queries in the selected data structure. For the details of the query method, reference can be made to FIGS. 8 and 14 and the corresponding descriptions herein above respectively.

The resultant dataset from the above various queries can be likewise presented to the user in the form of snapshots, charts, etc., or processed otherwise.

When querying according to a single cell position and a time range, querying based on the data organization method of the first embodiment can be performed faster. When querying according to a single time point and a cell range, querying based on the data organization method of the second embodiment can be performed faster. In other situations, it is hard to determine querying based on the data organization method of which embodiments can be performed faster. Since the present implementation of the change oriented spreadsheet application supports compression, when querying according to a single cell position and single time point, querying based on the data organization method of the first embodiment can be performed faster. When a cell range and a time range is given, it is difficult to determine querying based on the data organization method of which embodiment can be performed faster.

The embodiment of FIG. 16 has the advantages of both the embodiment of FIG. 4 and the embodiment of FIG. 10, and requires more work to synchronize and maintain the two kinds of data structures.

The following table summarizes the characteristics of the above different embodiments.

|  | First embodiment | Second embodiment | Third embodiment |
| --- | --- | --- | --- |
| First ordering criterion | Cell | Time | Both |
| Querying based on a single cell position and a single time point | Fast $O(Oa + \log 2N)/$ $O(Ow + \log 2N)$ | Slow $Oa \times O(N)/$ $Ow \times O(N)$ | Fast $O(Oa + \log 2N)/$ $O(Ow + \log 2N)$ |
| Querying based on a single cell position and a time range | Fast | Slow | Fast |
| Querying based on a single time point and a cell range | Slow | Fast | Fast |
| Maintenance cost | Low | Low | High |

Here, one embodiment of the file format of a spreadsheet file of the change oriented spreadsheet application is described by taking an extended OASIS file format as an example.

```
--------------------------------------------------------------
<define name="table-table-cell-content">
<optional>
    <ref name="table-cell-range-source"/>
</optional>
<optional>
    <ref name="office-annotation"/>
</optional>
<optional>
    <ref name="table-detective"/>
</optional>
    <zeroOrMore>
    <ref name="text-content"/>
    </zeroOrMore>
<optional>
    <ref name="table-cell-history-records"/>
</optional>
</define>
--------------------------------------------------------------
<define name="table-cell-history-records">
    <element name="table:cell-history-records">
    <oneOrMore>
    <ref name="table-cell-history-record">
    </oneOrMore>
    </element>
</define>
<define name="table-cell-history-record">
    <element name="table:cell-history-record">
    <ref name="table-cell-history-record-attlist"/>
    <ref name="table-cell-history-record-content"/>
    </element>
</define>
<define name="table-cell-history-record-attlist">
    <ref name="common-value-and-type-attlist"/>
    <ref name="table-cell-history-record-date">
</define>
<define name="table-cell-history-record-content">
    <ref name="text-content"/>
</define>
<define name="table-cell-history-record-date">
    <element name="table:history-date">
```

```
        <ref name="dateTime">
    </element>
</define>
```

Data Management of the Change Oriented Spreadsheet Application

When the user edits a spreadsheet file and activates the change oriented spreadsheet functions, the cell contents will be added with a "time" dimension. With the passage of time, the cell contents could become very large, and operations such as file open/save/query/search etc. would be performed very slowly, thus there is a need for data management operations such as deletion/archiving/restoration, etc. Moreover, a new function based on historical data archival, i.e. data refinement, is to be introduced here.

The basis of data management in the change oriented spreadsheet application according to the present invention is the data queries described above. The basic data units of a change oriented spreadsheet file reside in a three-dimensional space <row, column, time>. Therefore, the querying of cell contents can be performed on these three independent dimensions and their combinations.

Figure 18:
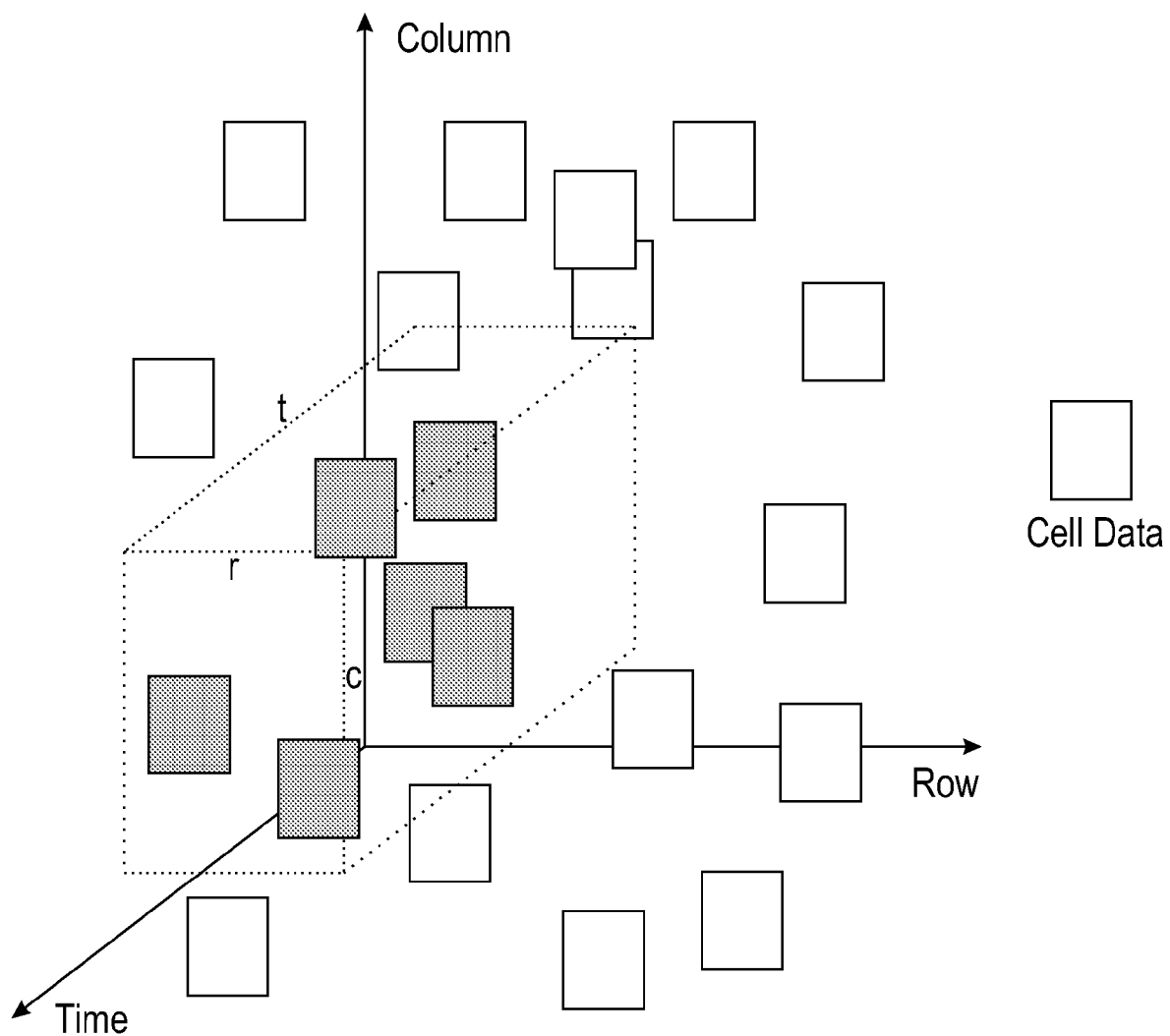
FIG. 18 is a schematic diagram illustrating a data query result with given continuous ranges of row, column, and time in a spreadsheet file.

FIG. 18 illustrates schematically a data query result with continuous row, column, and time ranges in a change oriented spreadsheet file. As shown, the querying result is a set of cell contents within a given cube. In fact, as mentioned above, the data query method of the present invention can be applied likewise even when the row, column and time ranges are not continuous.

A query operation in a conventional spreadsheet application is to query the content matching the query conditions, and present the matching cells in an ordinary spreadsheet view. Different from this, the input of a query operation in the change oriented spreadsheet application is the query conditions plus a query range. The query range is one or more three-dimensional ranges in a three dimensional space <row, column, time>. The change oriented spreadsheet application traverses valid updates in the query range according to the query conditions. The traversal method depends on the above described data organization methods of the change oriented spreadsheet application. And the output of the query operation comprises two parts. The basic output is a set of <row, column, time> meeting the query conditions; while from the viewpoint of users, the query result is change oriented spreadsheet elements such as snapshots, historical charts, etc. generated from the set.

1. Data Archival in the Change Oriented Spreadsheet Application

The historical data archival/restoration method according to an embodiment of the present invention is based on data unit queries addressed by values in the three-dimensional space <row, column, time>, that is, the datasets to be archived are those generated from various queries. The queries upon which data archival is based are generally those queries for data units within continuous row, column and time ranges, that is, the data units to be archived constitute a cube in the three-dimensional space <row, column, time>.

An archival file comprises a queried dataset, each data unit of which includes three attributes: the time, the position in the spreadsheet, and the value of the data unit. These three attributes can be included implicitly or explicitly. In general, the format of an archival file can be arbitrary, provided only that the information in the archived data not be lost during the saving. Thus, an ordinary text file may be a choice. But a well-organized archival file may have a higher performance during restoration, and may have some other additional functions.

An alternative file format is that with the same structure with the original change oriented spreadsheet file. In this file format, only valid updates are included, possibly lacking the current value of each cell. Therefore, for such an archival file, by using the same change oriented spreadsheet application, the valid updates can be used to generate snapshot views, ordinary views, and even another archival file. Thus, the change oriented spreadsheet application becomes a viewer of archival files. Generally this kind of archival files have a read-only property.

When a queried portion of a change oriented spreadsheet file is archived, the portion is split from the "mother" file. After the archival file is split from the "mother" file, there may be a need for data restoration. The historical data in the change oriented spreadsheet application is different with the data in other applications. The change oriented spreadsheet application is an extension to a spreadsheet application, in which both the current values and valid updates of cells are recorded in a spreadsheet file. The valid updates to a cell are semantically the same, because they generally describe the same object. Therefore, in restoration, the archival file should be recognized by the mother file in order not to damage the integrity of the original data.

Assuming an archival file A is split from its mother file MA, a new file MA'=MA−A will be obtained. Assuming also there is another set of files: a storage file B, a mother file MB, and a new mother file MB'=MB−B. The contents of the file A and file B are different. If the file B is to be restored to the file MA', MA' is required to be able to detect a mismatch, and return an alert/error. The key point of the problem is that the contents of A and B are different. Therefore, the content of the archival file can be used as its unique identifier (ID).

A general method is to make MA' have the capability to memorize the content of the file A. Therefore, a digital digest of the stored content can be calculated as the identifier of the archival file, and when the identifier is saved in the new mother file MA', the new mother file MA' can memorize the content of the file with much lower cost of disk space consumption. The digital digest is based on the archived dataset, each data unit of which has three attributes <time, position, update content> or four attributes <time, row, column, update content>. The candidates for the digital digest algorithm can be MD4 and SHA, and MD5 has better features and performance.

Multiple digital digests can be stored in a mother file, because the same mother file can be archived multiple times.

In addition, when a data unit in a change oriented spreadsheet file is archived, optionally a flag can be added to the data unit, in order to indicate to the user that a data unit is missing here.

Figure 19:
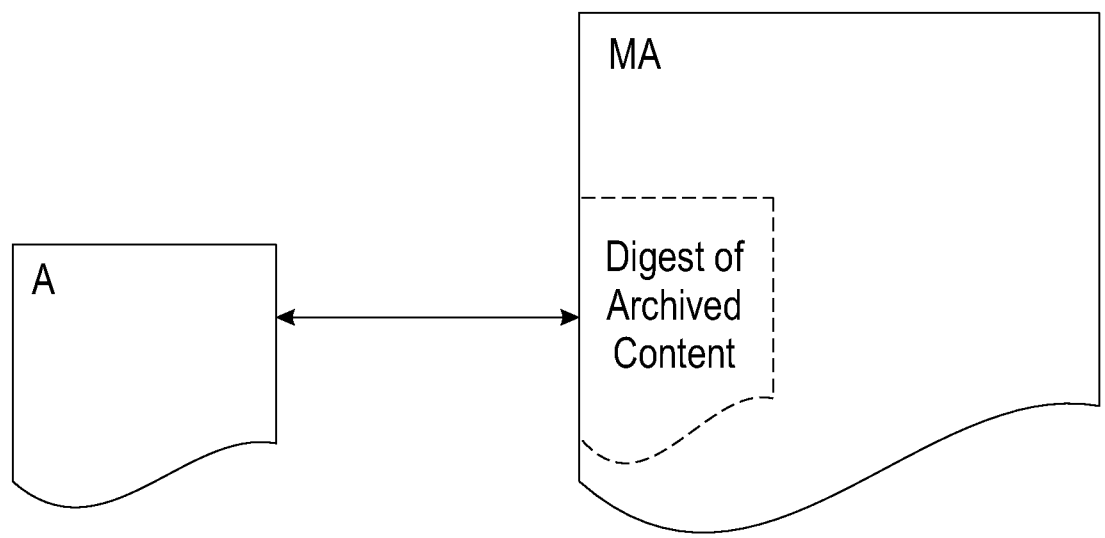
FIG. 19 is a schematic diagram illustrating the relationship between an archival file and its mother file.

FIG. 19 illustrates the relationship between an archived file and its mother file.

Figure 20:
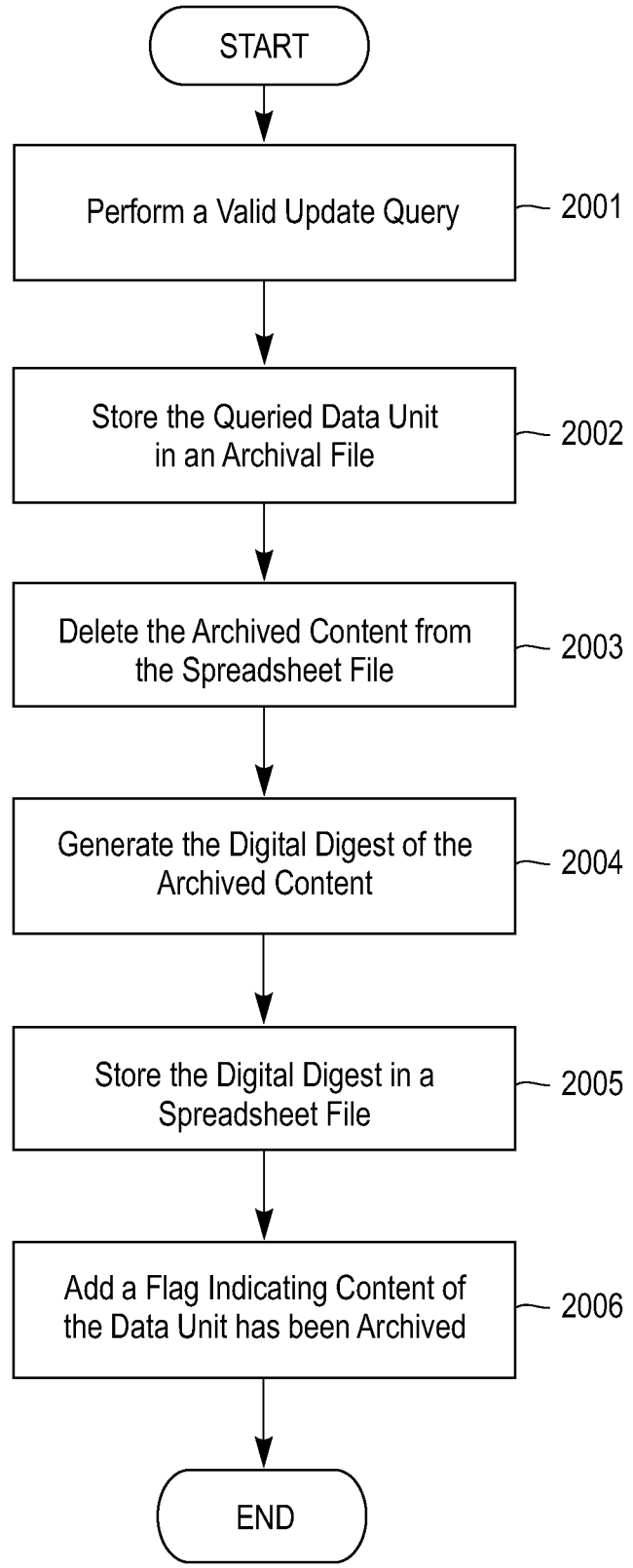
FIG. 20 is a flow diagram of one embodiment of a method for data archival based on data queries.

FIG. 20 illustrates a flow diagram of a method for data archival based on data queries. As shown, in step 2001, a data query as described above is performed on the spreadsheet file according to the data organization method of the change oriented spreadsheet application and the archival requirements. Then in step 2002, the data units obtained from the data query are stored in an archival file, wherein the each data unit stored in the archival file comprises the row and column position in the spreadsheet file, the update time, and the update content of the data unit. In step 2003, the contents of the data units obtained from the data query are deleted from the spreadsheet file. And preferably, in step 2004, a digital digest of the content in the archival file is generated, and in step 2005, the digital digest is stored in the spreadsheet file. Also, preferably, in step 2006, at each data unit in the spreadsheet application the content of which has been deleted, a flag indicating the content of the data unit has been archived is added.

The following is an exemplary archival file format, which is preferably essentially the same as the format of the mother file.

An XML schema of cell content based on the Office file definition of OASIS:

```
<define name="table-table-cell-content">
<optional>
    <ref name="table-cell-range-source"/>
</optional>
<optional>
    <ref name="office-annotation"/>
</optional>
<optional>
    <ref name="table-detective"/>
</optional>
<zeroOrMore>
    <ref name="text-content"/>
</zeroOrMore>
<optional>
    <ref name="table-cell-history-records"/>
</optional>
    </define>
```

The following is one embodiment of an extended XML schema of a spreadsheet file, showing the file is an archival file.

```
<define name="office-spreadsheet-attlist" combine="interleave">
<optional>
    <attribute name="table:structure-protected" a:defaultValue="false">
        <ref name="boolean"/>
    </attribute>
</optional>
<optional>
    <attribute name="table:history-used-for-archive"
    :defaultValue="false">
        <ref name="boolean"/>
    </attribute>
</optional>
<optional>
    <attribute name="table:protection-key">
        <ref name="string"/>
    </attribute>
  </optional>
  </define>
```

2. Restoration of an Archival File in the Change Oriented Spreadsheet Application Restoring an archival file is to restore the archival file to the corresponding positions in the three-dimensional space <row, column, time> of the mother file according to the <time, row, column, update content> stored in the archival file.

Before adding the valid updates into the mother file, a checking function should be performed using the digital digest stored in the mother file. The checking method includes:

Step 1, the content of the archival file, including the <time, position, update content> of each data unit is obtained.

Step 2, the digital digest of the content obtained in step 1 is calculated using a digest algorithm. The digest algorithm is the one having been used to generate the digital digest stored in the mother file during generating the archival file.

Step 3, the digital obtained in step 2 is compared with the digital stored in the mother file. If the two match, the content of the archival file will be restored into the mother file; if the two do not match, an exception is raised to show mismatch. If multiple digests are stored in the mother file, the digest obtained in step 2 should be compared with each of the digests in the mother file one by one, until a match is found or all the digests have been compared.

Figure 21:
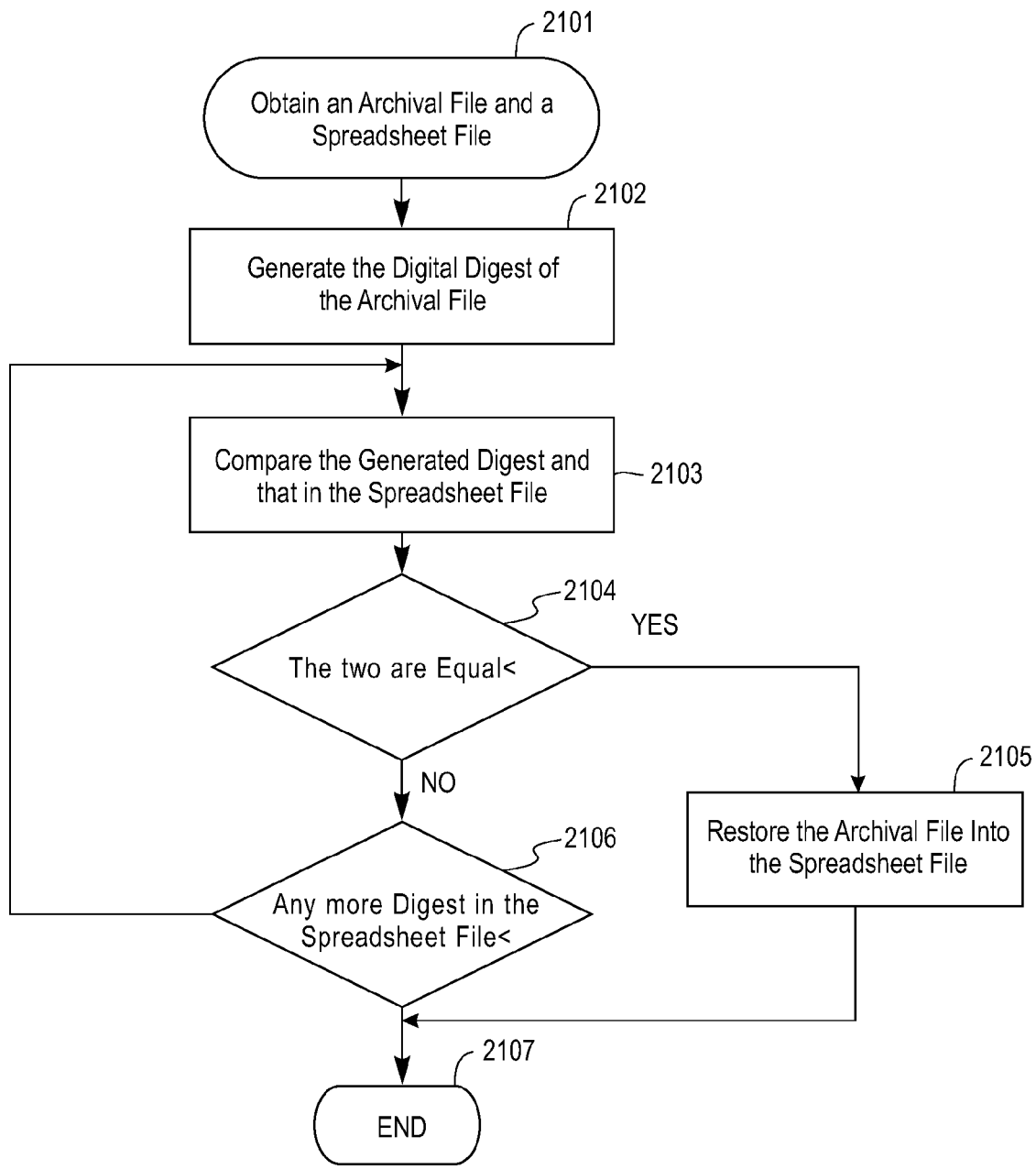
FIG. 21 is a flow diagram of one embodiment of a method for restoring archived data.

FIG. 21 illustrates the flow diagram of a method for restoring archived data when the format of the archival file and the format of the original file are the same. As shown, in step 2101, the archival file as obtained by the above described method and the spreadsheet file the archived content of which has been deleted are obtained, the spreadsheet file preferably containing the digital digest of the content of the archived file. Then preferably, in step 2102, the digital digest of the archived file content is calculated using the same algorithm as that which has been initially used to generate the digital digest of the archived file content contained in the spreadsheet file. Then in step 2103, the generated digital digest and the digest contained in the spreadsheet file are compared. The in step 2104, a determination is made as to whether the two are equal. If they are equal, then in step 2105, the update content of each data unit is restored to the corresponding row and column position and time point according to the row and column position and update time information of the each data unit in the archival file. If the two are not equal, then in step 2106, a determination is made as to whether there is any more digital digest contained in the spreadsheet file. If the determination is YES, then the method returns to perform step 2103, until a matching digital digest is found and the archival file is restored into the spreadsheet file, or no matching digital digest is found, and then the method ends in step 2107.

3. Data Deletion in the Change Oriented Spreadsheet Application

Data deletion in the change oriented spreadsheet application according to the present invention refers to deleting the content of data units in the spreadsheet file obtained by data queries. The queries on which the data deletion depends are generally the queries for cells within continuous row, column and time ranges, that is, the data units to be deleted constitute a cube in the three dimensional space <row, column, time>. Of course, data units at arbitrary rows, columns and time points can also be deleted.

Besides, when the content of a data unit in the change oriented spreadsheet file have been deleted, a flag can be added at the data unit, in order to indicate to the user that the content of the data unit is missing.

Figure 22:
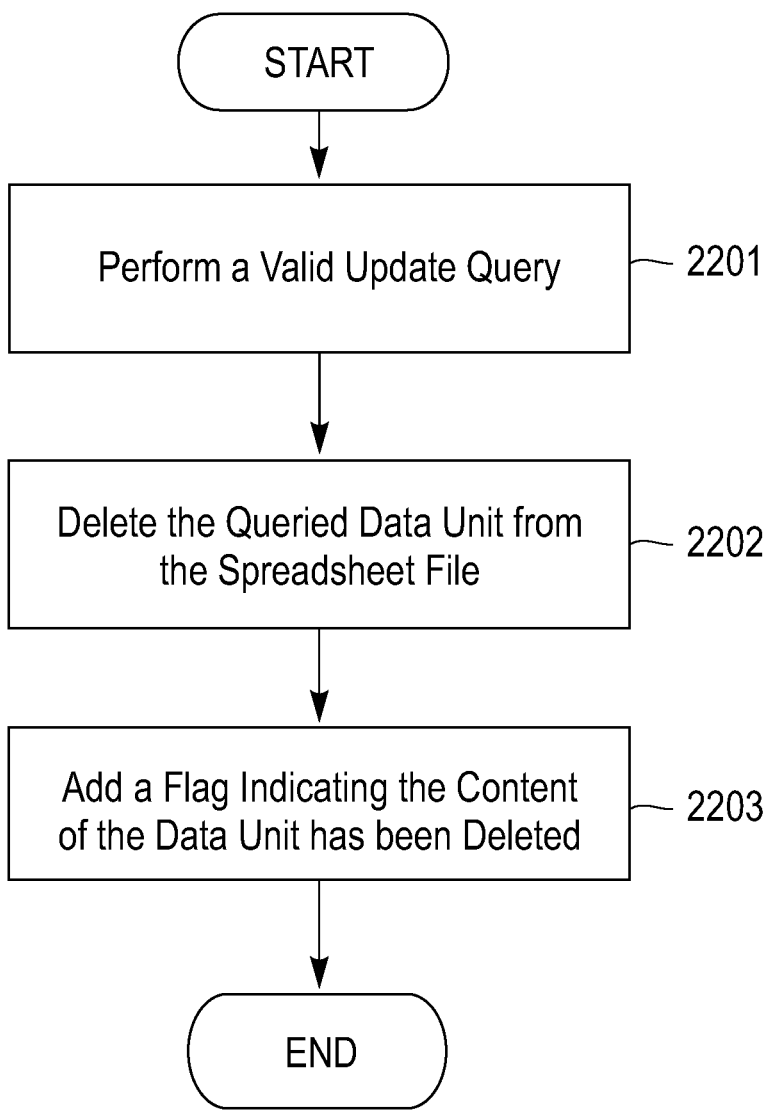
FIG. 22 is a flow diagram of one embodiment of a method for data deletion based on data queries.

FIG. 22 illustrates the flow diagram of a data deletion method based on the result of a data query. As shown, in step 2201, a data query as described above is performed on the spreadsheet file of the change oriented spreadsheet application. In step 2202, the data units obtained from the data query are deleted from the spreadsheet file. Preferably, in step 2203, at each of the data units the content of which have been deleted in the spreadsheet file, a flag indicating that the content of the data unit has been deleted is added.

4. Data Refinement in the Change Oriented Spreadsheet Application

For a change oriented spreadsheet file, apart from the cubic-like data queries in data archival, the data units in the three-dimensional space <row, column, time> can also be queried through discontinuous row/columns and discrete time ranges, and the query results can also be stored in a file in the same format as that of the original change oriented spreadsheet file. For example, we can query the data units in row 1, 3 and 4, column 3, and every Sunday afternoons in May and July of 2005, and store the query result in a file in the same format as that of the original change oriented spreadsheet file. Such a refined file can be used to present a refined report on the historical data. Therefore, such data refinement is a function of data reorganization or refinement in the change oriented spreadsheet application.

Data refinement is similar to data archival, but they have the following differences:

Firstly, due to their different purposes, the data queries on which the data archival function is based are usually for a cube of continuous row, column and time ranges in the three-dimensional space <row, column, time>, while the data refinement function is based on more flexible data queries.

Secondly, since the main purpose of an archival file is to store data, its format can be different from that of the original change oriented spreadsheet file. Whereas, since a refined file is usually used for presentation, its format should be the same as that of the original change oriented spreadsheet file. Moreover, an archival file is usually composed of valid updates meeting the query conditions, while a refined file should comprise the current values of selected cell positions in order to obtain better presentation effects. In particular, when generating the refined file at a time point and within a cell range of a spreadsheet file of the change oriented spreadsheet application according to the present invention, the refined file should not only comprise the valid updates of the cells within the cell range which have the valid updates actually occurring at the time point, but also comprise the current values the cells that have no valid updates actually occurring at the time point, i.e., the valid updates of the cells occurring the latest before the time point. And when generating the refined file of the spreadsheet file within a time range and a cell range, for those cells within the cell range that have no valid updates actually occurring at the starting time point in the time range, the refined file should comprise at least the current values of the cells at the starting time point.

The most important difference between the data archival and data refinement is that the archival function will delete the selected updates from the mother file, while the data refinement will not. A refined file is only a refined copy of the original change oriented spreadsheet file. Therefore, when refining a change oriented spreadsheet file, the digest of the selected content will not be stored in the mother file.

Figure 23:
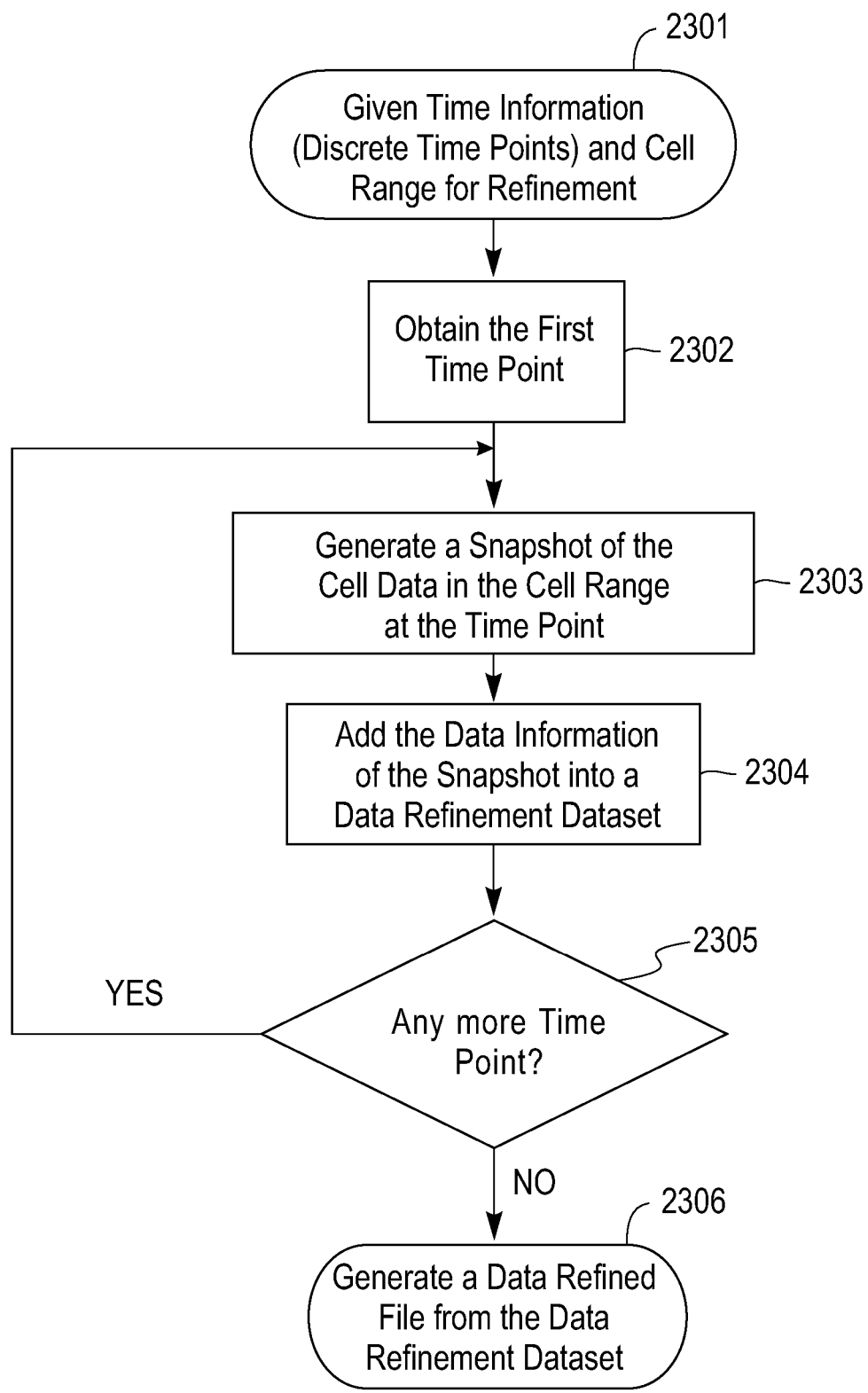
FIG. 23 is a flow diagram of one embodiment of a method for data refinement based on data queries.

FIG. 23 illustrates the flow diagram of a method for data refinement based on data queries, wherein the time for the data refinement are discreet time points. As shown, in step 2301, given time information and a cell range for the data refinement are obtained, wherein the time information is discreet time points. In step 2302, the first time point in the time points is obtained. In step 2303, the snapshot of the cell data at the time point and within the cell range is generated, wherein the cell position information of the valid updates in the data snapshot is consistent with their corresponding information in the original file; the time information of the valid updates in the data snapshot is consistent with the time points information to which the snapshot corresponds, i.e., the discreet time point values for generating the snapshot; and the first choice for the content information of the valid updates in the data snapshot is the contents of the valid updates of the cell positions occurring at the time point, the second choice is the contents of the valid updates of the cell positions occurring the latest before the time point, and the third choice is the contents of the cell positions at the earliest time. In step 2304, the data information of the snapshot is added into a data refinement dataset. In step 2305, it is determined whether there is any more time point. If the determination is YES, the method returns to perform step 2303. Otherwise the method returns to step 2306, where the data refinement file is generated from the data refinement dataset.

When the data refinement is directed to the valid updates within a continuous time range and cell range, the valid updates corresponding to the cell range occurring within the continuous time range are queried, the cell position information, update time information, and content information of the valid updates are consistent with the corresponding information in the original file. Then the data refined file is generated based on the query result.

In the foregoing, several data organization methods of the change oriented spreadsheet application according to embodiments of the present invention, data query and presentation methods based on these data organization methods, and data maintenance methods, including data archival, data restoration, data deletion and data refinement methods based on these data query methods are described. It should be noted that, for the convenience of narration, the steps in the methods are described in particular orders, it being understood, however, that other orders are also possible, and some of the steps may be altered, combined, removed, and other steps may be added, all of which are within the scope and spirit of the present invention. The various steps in the query methods are provided only as examples, and it will be understood by those skilled in the art that other query methods can be implemented based on the data organization methods of the change oriented spreadsheet application described herein.

Apart from the above methods, the present invention can also be implemented as the corresponding apparatus and system. In particular, according to the embodiments of FIGS. 4-9, there is provided a data organization apparatus for a change oriented spreadsheet application, the apparatus being configured to store the valid updates and the update times of cells with the cell positions as the primary index, and all the valid updates of the same cell being arranged in the order of time.

According to the embodiment of FIGS. 10-15, there is provided a data organization apparatus for a change oriented spreadsheet application, the apparatus being configured to store the valid updates of cells with the update time points of the valid updates of the cells as the primary index, and arrange all the valid updates at the same valid update time point into an update table, the update table having the same cell structure as the spreadsheet file.

According to the embodiments of FIGS. 16-23, there is provided a data organization apparatus for a change oriented spreadsheet application, the apparatus being configured to store the valid updates to cells and the update times in the spreadsheet file of the change oriented spreadsheet application; and to maintain a first data structure and a second data structure on the valid updates; wherein, in the first data structure, the valid updates to cells and the update times are stored with the cell positions as the primary index, and all valid updates to the same cell are arranged in the order of time, while in the second data structure, the valid updates to cells are stored with the update time points of the valid updates to the cells as the primary index, and all valid updates at the same update time point are arranged into an update table which has the same cell structure as the spreadsheet file.

Figure 24:
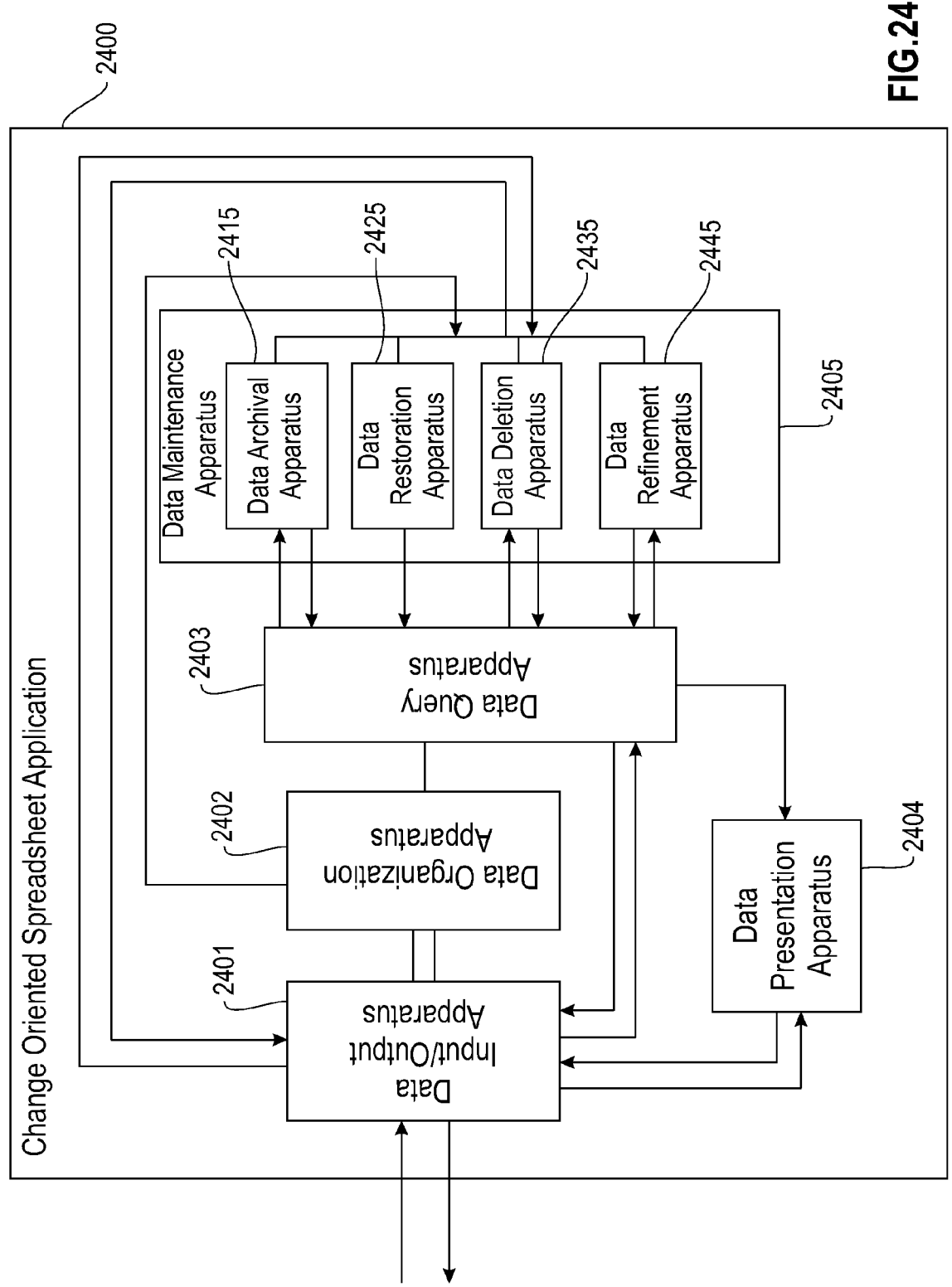
FIG. 24 is a block diagram illustrating a change oriented spreadsheet application system according to an embodiment of the present invention.

In addition, the present invention further provides a change oriented spreadsheet application system. FIG. 24 illustrates a change oriented spreadsheet application system 2400 according to an embodiment of the present invention. As shown, the system 2400 comprises: an input/output apparatus for receiving input data and operation instructions to the spreadsheet application from outside and outputting the output data of the change oriented spreadsheet application; any data organization apparatus 2402 for the change oriented spreadsheet application as described above; a data querying apparatus 2403 for querying the data of the change oriented spreadsheet application as organized by the data organization apparatus 2402 by using any corresponding data query method as described above; and a data presentation apparatus 2404 for presenting the data queried out by the data query apparatus 2403 by using any of the corresponding data presentation methods as described above.

Furthermore, the change oriented spreadsheet application system according to the present invention further comprises an apparatus 2405 for data maintenance based on queries by the data query apparatus 2403 of the data as organized by the data organization apparatus 2402 by using any one or more of the data maintenance methods as described above, the data maintenance apparatus 2405 comprises at least one of the following apparatuses: a data archival apparatus 2415 for archiving a spreadsheet file of the change oriented spreadsheet application; a data restoration apparatus 2425 for restoring the archived data; a data deletion apparatus 2435 for deleting the data of a spreadsheet file; and data refinement apparatus 2445 for refining the data of a spreadsheet file.

With reference to FIG. 24, the input/output apparatus 2401 receives the data for the change oriented spreadsheet application from outside (e.g., the user), such as the input data, e.g. valid updates to cells of a spreadsheet file, and user instructions which command the data organization apparatus 2402 to record the valid updates, and provides them to the data organization apparatus 2402. The data organization apparatus 2402 records the input data in an appropriate data structure according to the user's instructions. Then the data organization apparatus 2402 may provide the spreadsheet file containing the recorded data to the input/output apparatus for permanent storage. Alternatively, the data query apparatus 2403, under instructions from the data input/output apparatus 2401, may query the data recorded by the data organization apparatus 2402, and present the query results to the data presentation apparatus 2404, and the data presentation apparatus 2404, under the instructions from the data input/output apparatus 2401, may perform appropriate analysis and processing on the query results to generate snapshots, charts etc., and provide them to the data input/output apparatus for presentation to the user or for permanent storage. The data archival apparatus 2415 in the data maintenance apparatus 2405, under the instructions from the input/output apparatus 2401, may utilize the query results obtained by the data query apparatus 2403 to perform data archival on a spreadsheet file from the data organization apparatus 2402 or input/output apparatus 2401, and provide the archival file to the input/output apparatus 2401 for permanent storage, or provide it to the data query apparatus 2403 for querying and presentation. The data restoration apparatus 2425, under the user instructions from the input/output apparatus 2401, may restore an archival file from the input/output apparatus 2402 into a spreadsheet file from the input/output apparatus 2401, and provide the restored spreadsheet file to the input/output apparatus 2401 for permanent storage, or provide it to the data query apparatus for querying and presentation. The data deletion apparatus 2435, under the instructions from the input/output apparatus 2401, may utilize the query results obtained from the data query apparatus 2403 to perform data deletion on a spreadsheet file from the data organization apparatus 2402 or input/output apparatus 2401, and provide the spreadsheet after deletion to the input/output apparatus 2401 for permanent storage, or provide it to the data query apparatus 2403 for querying and presentation. The data refinement apparatus 2445, under the instructions from the input/output apparatus 2401, may utilize the query results obtained from the data query apparatus to perform data refinement on a spreadsheet file from the data organization apparatus 2402 or the input/output apparatus 2401, and provide the refined file to the input/output apparatus 2401 for permanent storage, or provide it to the data query apparatus 2403 for querying and presentation. Besides, the input/output apparatus 2401 may also provide a spreadsheet file from outside to the data query apparatus directly for querying and presentation.

In the foregoing, a data organization apparatus and a change oriented spreadsheet application system comprising such a data organization apparatus have been described. It should be noted that the above description is presented only for illustrative purposes, and is not intended to limit the present invention to the precise form presented. For example, the connection relationships between the components of the described apparatus may be changed, and they may be combined into larger components, or be split further into smaller components, some new components may be added, and some components may be removed, all of which are within the spirit and scope of the present invention, provided only that they can implement the functions of the present invention.

Further, in the examples of the data structures described herein, there may be many variations, including, but not limited to fewer or different fields; fields in a differing order; different sizes of fields; etc. Again, these fields are only provided as an example, and many variations may be included.

The flow diagrams depicted herein are exemplary. There may be many variations to these diagrams or the steps or operations described without departing from the spirit of the invention. For instance, the steps may be performed in a differing order, or steps may be added, deleted or modified. All of these variations are considered a part of the invention as claimed.

One or more aspects of the present invention can be included in an article of manufacture (e.g., one or more computer program products) having, for instance, computer usable or machine readable media, such as a floppy disk, a high capacity read-only memory, an optically readable compact disc or CD-ROM or DVD, a tape, a transmission type media such as a digital or analog communications link, or the like commonly found in the arts which is capable of retaining thereon a computer executable program and/or computer readable data. The media has embodied therein, for instance, computer readable program code means or logic (e.g., instructions, code, commands, etc.) to provide and facilitate the capabilities of the present invention. Additionally, at least one program storage device readable by a machine embodying at least one program of instructions executable by the machine to perform the capabilities of the present invention can be provided. The article of manufacture can be included as a part of a computer system or sold separately.

The present invention can be realized in hardware, software, or a combination of hardware and software. The hardware comprising, at least in part, at least a CPU, main storage, and a memory. The software comprising, at least in part, an operating system and executable code for manipulating I/O and communicating with a user. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. Further, one or more of the capabilities can be emulated in one or more virtual environments.

The present invention also can be embedded in a computer program product, which comprises all the features enabling the implementation of the methods described herein, and which when loaded in a computer system is able to carry out these methods.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for a change oriented spreadsheet application, comprising:
   storing, in a spreadsheet file, a sequence of valid updates to a plurality of cells of the change oriented spreadsheet application, wherein each of the valid updates corresponds to a change in a respective cell of the change oriented spread sheet, wherein each of the valid updates occurs at a respective update time;
   storing, with a primary index, a plurality of update times comprising the respective update time for each valid update within the sequence of valid updates, wherein the primary index is based upon a cell position for each valid update;
   arranging the valid updates in an order of time;
   maintaining a first data structure and a second data structure on the valid updates, wherein,
      in the first data structure, the valid updates to cells and the update times are stored with cell positions as a respective primary index, and wherein all valid updates to a same cell are arranged in order of time, and
      in the second data structure, valid updates to cells are stored with the update times of the valid updates to each of the cells as a respective primary index, and all valid updates having a same update time are arranged into a sequence of update tables each having a same cell structure as the spreadsheet file;
   performing a first query on the spreadsheet file for valid updates with update times occurring within a first given time range and with cell positions within a first given cell range, wherein the first given cell range comprises discontinuous ranges of rows and columns within the spreadsheet file and the first given time range comprises discrete time ranges, the first query comprising:
   traversing, based on the first data structure, through the given first cell range; and
   for each cell position in the given first cell range, performing:
      looking up the sequence of valid updates associated with each cell in identified by each cell position by using the primary index;
      looking up each valid update with the cell's update time falling within the first given time range in the sequence of valid updates; and
      adding the each valid update to a query result dataset;
   performing a second query on the spreadsheet file for current values of cells at a second given update time and within a second given cell range, the second query comprising:
   traversing, based on the first data structure, through the second given cell range; and
   for each cell position in the second given cell range, performing:
      looking up the sequence of valid updates associated with each cell identified by each cell position by using the cell position as the primary index;
      looking up each valid update with the cell's maximum update time less than or equal to the given second update time in the sequence of valid updates; and
      adding the each valid update into the query result dataset;
   performing a third query of a subset of cells within the spreadsheet file for data units satisfying a query condition, the subset of cells including cells with update times and cell positions within a third given time range and a given third cell range, the third query comprising:
   selecting, based on the third given time range and the third cell range, one of the first data structure and the second data structure;
   performing in response to selecting the first data structure:
      traversing, based on the first data structure, through the third given cell range; and
   for each cell position within the third given cell range, performing:
      looking up the sequence of valid updates associated with the cell in the spreadsheet file by using the cell position as the primary index;
      looking up each valid update with the cell's update time falling within the third given time range in the sequence of valid updates; and
      for each of valid update, performing:
         determining whether an examined valid update within the each valid update meets the query condition; and
         if it is determined that the examined valid update meets the given query conditions, adding an update time and a cell position corresponding to the examined valid update into the query result dataset;
   performing in response to selecting the second data structure:
      traversing, based on the second data structure, through the third given time range; and
   for each update time within the third given time range, performing:
      looking up said sequence of valid updates associated with the update time in the spreadsheet file by using the update time as said primary index;
      looking up each cell position falling within the third cell range in the sequence of valid updates; and
      on the each valid update produced by the looking up the sequence and looking up each cell position, performing:
         determining whether the valid update meets the query condition; and
         in response to determining that the valid update meets the query condition, adding the update time and the cell position into the query result dataset;
      performing a data query on the spreadsheet file;
      storing the query result dataset in an archival file, wherein each data unit stored in the archival file contains row and column position, update time, and update content;

generating a digital digest of the archival file;
storing said digital digest in the spreadsheet file;
deleting, from the spreadsheet file, data contained within data units corresponding to data with the query result dataset; and
setting, in response to the deleting, a flag in the data units corresponding to data with the query result dataset.

2. A method for a change oriented spreadsheet application, comprising:
determining that at least some cells in a change oriented spreadsheet application are associated with a sequence of updates, wherein each update in the sequence of updates identifies a respective cell of the at least some cells, and wherein each update in the sequence of updates corresponds to a change in the identified respective cell and occurs at an update time;
determining the sequence of updates is a valid sequence of updates based on a confirmation received by a user of the change oriented spreadsheet application;
storing, in response to the determining that the sequence of updates is a valid sequence of updates, in a spreadsheet file each valid update in the sequence of valid updates, wherein at least one valid update in the sequence of valid updates is stored with an original set of content from the cell associated with the at least one valid update;
storing the update time for each of the sequence of valid updates with cell positions as a primary index; and
arranging the valid updates that have been stored in an order of time based on the update time at which the valid updates occurred.

3. The method of claim 2, further comprising:
performing a query on the spreadsheet file for the valid updates within a given time range and within a given cell range, the query comprising:
traversing through the given cell range; and
for each cell position in the given cell range, performing:
looking up the sequence of valid updates associated with the cell in the spreadsheet file by using the primary index;
looking up each valid update with the cell's update time falling within the given time range in said sequence of valid updates associated with the cell; and
adding the valid update to a query result dataset.

4. The method of claim 2, further comprising performing a query on the spreadsheet file for current values of cells at a given update time and within a given cell range, the query comprising: traversing through the given cell range; and
for each cell position in the given cell range, performing:
looking up the sequence of valid updates associated with each cell identified by each cell position by using the cell position as the primary index;
looking up each valid update with a maximum update time of the cell being less than or equal to the given update time in the sequence of valid updates associated with the cell; and
adding the valid update into a query result dataset.

5. The method of claim 2, further comprising:
performing a query on the spreadsheet file for update times and cell positions of a data units meeting a query condition within a given time range and a cell range, the query comprising:
traversing through the cell range; and
for each cell position within the cell range, performing:
looking up the sequence of valid updates associated with each cell identified by each cell position by using the cell position as the primary index;
looking up each valid update with the cell's update time falling within the given time range in the sequence of valid updates associated with the cell; and on the valid update, performing:
determining whether the valid update meets the query condition; and
if it is determined that the valid update meets the query condition, adding the update time and the cell position into a query result dataset.

6. The method of claim 2, further comprising:
arranging the valid updates having a same valid update time into a sequence of update tables, each update table having a same cell structure as the spreadsheet file.

7. The method of claim 2, further comprising:
maintaining a first data structure and a second data structure on the valid updates, wherein, in the first data structure, the valid updates to cells and the update times are stored with cell positions as a primary index, and wherein all valid updates to a same cell are arranged in order of time, and in the second data structure, valid updates to cells are stored with the update times of the valid updates to each of the cells as a primary index, and all valid updates having a same update time point are arranged into a sequence of update tables each having a same cell structure as the spreadsheet file.

8. The method of claim 2, further comprising:
performing a data query on the spreadsheet file;
storing data units from the data query in an archival file, wherein each data unit stored in the archival file contains row and column position, update time, and update content;
generating a digital digest of the archival file;
storing the digital digest in the spreadsheet file; and
deleting data units generated by the data query from the spreadsheet file.

9. A non-transitory computer readable storage medium for a change oriented spreadsheet application, the compute readable storage medium comprising programming instructions for:
determining that at least some cells in a change oriented spreadsheet application are associated with a sequence of updates, wherein each update in the sequence of updates identifies a respective cell of the at least some cells, and wherein each update in the sequence of updates corresponds to a change in the identified respective cell and occurs at an update time;
determining the sequence of updates is a valid sequence of updates based on a confirmation received by a user of the change oriented spreadsheet application;
storing, based on the determining that the sequence of updates is a valid sequence of updates, in a spreadsheet file each valid update in the sequence of valid updates;
storing, based on the determining that the sequence of updates is a valid sequence of updates, the update time for each of the sequence of valid updates with cell positions as a primary index, wherein at least one valid update in the sequence of valid updates is stored with an original set of content from the cell associated with the at least one valid update; and
arranging the valid updates that have been stored in an order of time based on the update time at which the valid updates occurred.

10. The computer readable storage medium of claim 9, further performing a query on the spreadsheet file for the valid updates within a given time range and within a given cell range, the query comprising:

traversing through the given cell range; and
for each cell position in the given cell range, performing:
looking up the sequence of valid updates associated with the cell in the spreadsheet file by using the primary index;
looking up each valid update with the cell's update time falling within the given time range in the sequence of valid updates associated with the cell; and
adding the valid update to a query result dataset.

11. The computer readable storage medium of claim 9, further performing a query on the spreadsheet file for current values of cells at a given time point and within a given cell range, the query comprising:
traversing through the given cell range; and
for each cell position in the given cell range, performing:
looking up the sequence of valid updates associated with each cell identified by each cell position by using the cell position as the primary index;
looking up each valid update with a maximum update time of the cell being less than or equal to the given time point in the sequence of valid updates associated with each cell; and
adding the valid update into a query result dataset.

12. The computer readable storage medium of claim 9, further performing a query on the spreadsheet file for time points and cell positions of a data units meeting a query condition within a given time range and a cell range, the query comprising:
traversing through the cell range; and
for each cell position within the cell range, performing:
looking up the sequence of valid updates associated with the cell in the spreadsheet file by using the cell position as the primary index;
looking up each valid update with the cell's update time falling within the given time range in the sequence of valid updates associated with the cell;
on the valid update, performing:
determining whether the valid update meets the query condition; and
if it is determined that the valid update meets the query condition, adding the time point and the cell position into a query result dataset.

13. The computer readable storage medium of claim 9, further performing arranging the valid updates having a same valid update time point into a sequence of update tables, each update table having a same cell structure as the spreadsheet file.

14. The computer readable storage medium of claim 9, further comprising:
maintaining a first data structure and a second data structure on the valid updates, wherein, in the first data structure, the valid updates to cells and the update times are stored with cell positions as a primary index, and wherein all valid updates to a same cell are arranged in order of time, and in the second data structure, valid updates to cells are stored with the update time points of the valid updates to each of the cells as a primary index, and all valid updates having a same update time point are arranged into a sequence of update tables each having a same cell structure as the spreadsheet file.

15. The computer readable storage medium of claim 9, further comprising:
performing a data query on the spreadsheet file;
storing data units from the data query in an archival file, wherein each data unit stored in the archival file contains row and column position, update time, and update content;
generating a digital digest of the archival file;
storing the digital digest in the spreadsheet file; and
deleting data units generated by the data query from the spreadsheet file.

16. A computer system for a change oriented spreadsheet application, the system having a CPU, memory, and a storage device, and comprising:
an input/output device for communicating with a user; and
a machine instruction set, executable by the CPU, the machine instruction set comprising:
determining that at least some cells in a change oriented spreadsheet application are associated with a sequence of updates, wherein each update in the sequence of updates identifies a respective cell of the at least some cells, and wherein each update in the sequence of updates corresponds to a change in the identified respective cell and occurs at an update time;
determining the sequence of updates is a valid sequence of updates based on a confirmation received by a user of the change oriented spreadsheet application;
storing, based on the determining that the sequence of updates is a valid sequence of updates, in a spreadsheet file each valid update in the sequence of valid updates,
wherein at least one valid update in the sequence of valid updates is stored with an original set of content from the cell associated with the at least one valid update;;
storing, based on the determining that the sequence of updates is a valid sequence of updates, the update time for each of the sequence of valid updates with cell positions as a primary index; and
arranging the valid updates that have been stored in an order of time based on the update time at which the valid updates occurred.

17. The computer system of claim 16, further comprising:
a data query apparatus for performing a query on the spreadsheet file for the valid
updates within a given time range and within a given cell range, the query comprising:
traversing through the given cell range; and
for each cell position in the given cell range, performing:
looking up the sequence of valid updates associated with the cell in the spreadsheet file by using the primary index;
looking up each valid update with the cell's update time falling within the given time range in the sequence of valid updates associated with the cell; and
adding the valid update to a query result dataset.

18. The computer system of claim 16, further comprising a data query apparatus for a query on the spreadsheet file for current values of cells at a given time point and within a given cell range, the query comprising:
traversing through the given cell range; and
for each cell position in the given cell range, performing:
looking up the sequence of valid updates associated with each cell identified by each cell position by using the cell position as the primary index;
looking up each valid update with a maximum update time of the cell being less than or equal to the given time point in the sequence of valid updates associated with each cell; and
adding the valid update into a query result dataset.

19. The computer system of claim 16, further comprising:
a data query apparatus for performing a query on the spreadsheet file for time points and cell positions of a data units meeting given a query condition within a given time range and a cell range, the query comprising:

traversing through the cell range; and for each cell position within the cell range, performing:
- looking up the sequence of valid updates associated with the cell in the spreadsheet file by using the cell position as the primary index;
- looking up each valid update with the cell's update time falling within the given time range in the sequence of valid updates associated with the cell;
- on the valid update, performing:
    - determining whether the valid update meets the query condition; and
    - if it is determined that the valid update meets the query condition, adding the time point and the cell position into a query result dataset.

20. The computer system of claim 16, the machine instruction set further comprising:

arranging the valid updates having a same valid update time point into a sequence of update tables, each update table having a same cell structure as the spreadsheet file.

* * * * *